United States Patent
Deshpande et al.

(10) Patent No.: US 7,975,282 B2
(45) Date of Patent: Jul. 5, 2011

(54) DISTRIBUTED CACHE ALGORITHMS AND SYSTEM FOR TIME-SHIFTED, AND LIVE, PEER-TO-PEER VIDEO STREAMING

(75) Inventors: Sachin G. Deshpande, Vancouver, WA (US); Jeonghun Noh, Stanford, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 772 days.

(21) Appl. No.: 11/933,730

(22) Filed: Nov. 1, 2007

(65) Prior Publication Data

US 2009/0119734 A1 May 7, 2009

(51) Int. Cl.
*G06F 13/00* (2006.01)
*G06F 15/16* (2006.01)
(52) U.S. Cl. ............... 725/93; 725/100; 725/116
(58) Field of Classification Search ............ 709/211, 709/226
See application file for complete search history.

(56) References Cited

U.S. PATENT DOCUMENTS

| | | | |
|---|---|---|---|
| 5,995,623 A | 11/1999 | Kawano et al. | |
| 6,363,149 B1 | 3/2002 | Candelore | |
| 7,174,385 B2 | 2/2007 | Li | |
| 2002/0162109 A1* | 10/2002 | Shteyn | 725/87 |
| 2002/0194601 A1* | 12/2002 | Perkes et al. | 725/44 |
| 2003/0126277 A1 | 7/2003 | Son et al. | |
| 2003/0219235 A1* | 11/2003 | Nakatani et al. | 386/111 |
| 2004/0034550 A1 | 2/2004 | Menschik et al. | |
| 2006/0080454 A1 | 4/2006 | Li | |
| 2006/0095401 A1* | 5/2006 | Krikorian et al. | 707/1 |
| 2006/0107286 A1* | 5/2006 | Connor et al. | 725/31 |
| 2006/0190615 A1 | 8/2006 | Panwar et al. | |
| 2007/0130360 A1 | 6/2007 | Li | |
| 2007/0130361 A1 | 6/2007 | Li | |
| 2007/0150601 A1 | 6/2007 | Angelica | |
| 2008/0205291 A1* | 8/2008 | Li et al. | 370/254 |
| 2008/0235746 A1* | 9/2008 | Peters et al. | 725/111 |

FOREIGN PATENT DOCUMENTS

| | | |
|---|---|---|
| EP | 1 643 716 A1 | 4/2006 |
| JP | 2004-260532 | 9/2004 |
| JP | 2006-079606 | 3/2006 |
| JP | 2006-221457 | 8/2006 |
| WO | WO 02/07388 A2 | 1/2002 |

OTHER PUBLICATIONS

Chi,H.;Zhang,Q;Jia,J.;& Shen,X.;"Efficient Search and Scheduling in P2P-based Media-on-Demand Streaming Service," Jan. 2007,pp. 119-130,IEEE Journal on Selected Areas,vol. 25,No. 1.
Guo,Y.;Suh,K.;Kurose,J.;Towsley,D.,"P2Caast:Peer-to-peer Patching Scheme for VoD Service," May 20-24, 2003, Proceedings of the 12th World Wide Web Conference, Budapest, Hungary.
Do,T.;Hua,K.;& Tantaoui, M.,"P2VoD: Providing Fault Tolerant Video-on-Demand Streaming in Peer-to-Peer Environment," Jun. 2004,IEEE ICC 04, Paris.

(Continued)

*Primary Examiner* — Andrew Y Koenig
*Assistant Examiner* — Carmine Malangone
(74) *Attorney, Agent, or Firm* — Michael Blaine Brooks, PC; Michael B. Brooks; David Ripma

(57) ABSTRACT

Systems, devices and methods for supporting live and time-shifted video streaming via distributed caching of portions of video streams shared in peer-to-peer portions of systems.

6 Claims, 15 Drawing Sheets

OTHER PUBLICATIONS

Cui, Y.; Li, B.; & Nahrstedt, K., "oStream:Asynchronous Streaming Multicast in Application-Layer Overlay Networks," Jan. 2004, IEEE Journal on Selected Areas, vol. 22, No. 1.

Stoica,I.;Morris,R.;Karger,D.;Kaashoek,F.;& Balakrishnan, H.,"Chord:A Scalable Peer-to-peer Lookup Service for Internet Applications," Aug. 2001,SIGCOMM'01, San Diego, Calif., USA.

Castro,M.;Druschel,P.;Hu,Y.;& Rowstron,A.,"Proximity neighbor selection in tree-based structured peer-to-peer overlays," 2003, Technical Report MSR-TR-2003-52, Microsoft Corp.

Maymounkov, Petar and Mazieres, David,"Kademlia: A Peer-to-peer Information System Based on the XOR metric,"Mar. 2002, Cambridge, USA.

Baset, Salman A. and Schulzrinne, Henning G.,"An Analysis of the Skype Peer-to-Peer Internet Telephony Protocol," 2006, IEEE Infocom 2006.

Setton,E.;Noh,J.;& Girod,B.,"Congestion-Distortion Optimized Peer-To-Peer Video Streaming," Oct. 2006, International Conference on Image Processing (ICIP), Atlanta, USA.

Setton,E.;Noh,J.;& Girod,B.,"Low-Latency Video Streaming Over Peer-To-Peer Networks," Jul. 2006, Toronto, Canada.

The ns Manual (formerly ns Notes and Documentation), The VINT Project,[online],[retrieved on Jun. 2, 2006]. Retrieved from the Internet <URL:http://www.isi.edu/nsnam/ns/>.

Hamid, Nadeem Abdul,"A Lightweight Framework for Peer-To-Peer Programming," May 2007, pp. 98-104, Journal of Computing Science in Colleges, vol. 22, No. 5.

Zegura, Ellen, Calvert, Kenneth, and Bhattacharjee, Samrat,"How to Model an Internetwork", 1996, IEEE INFOCOM.

Notice of Allowance for U.S. Appl. No. 11/933,723 mailed May 6, 2011.

* cited by examiner

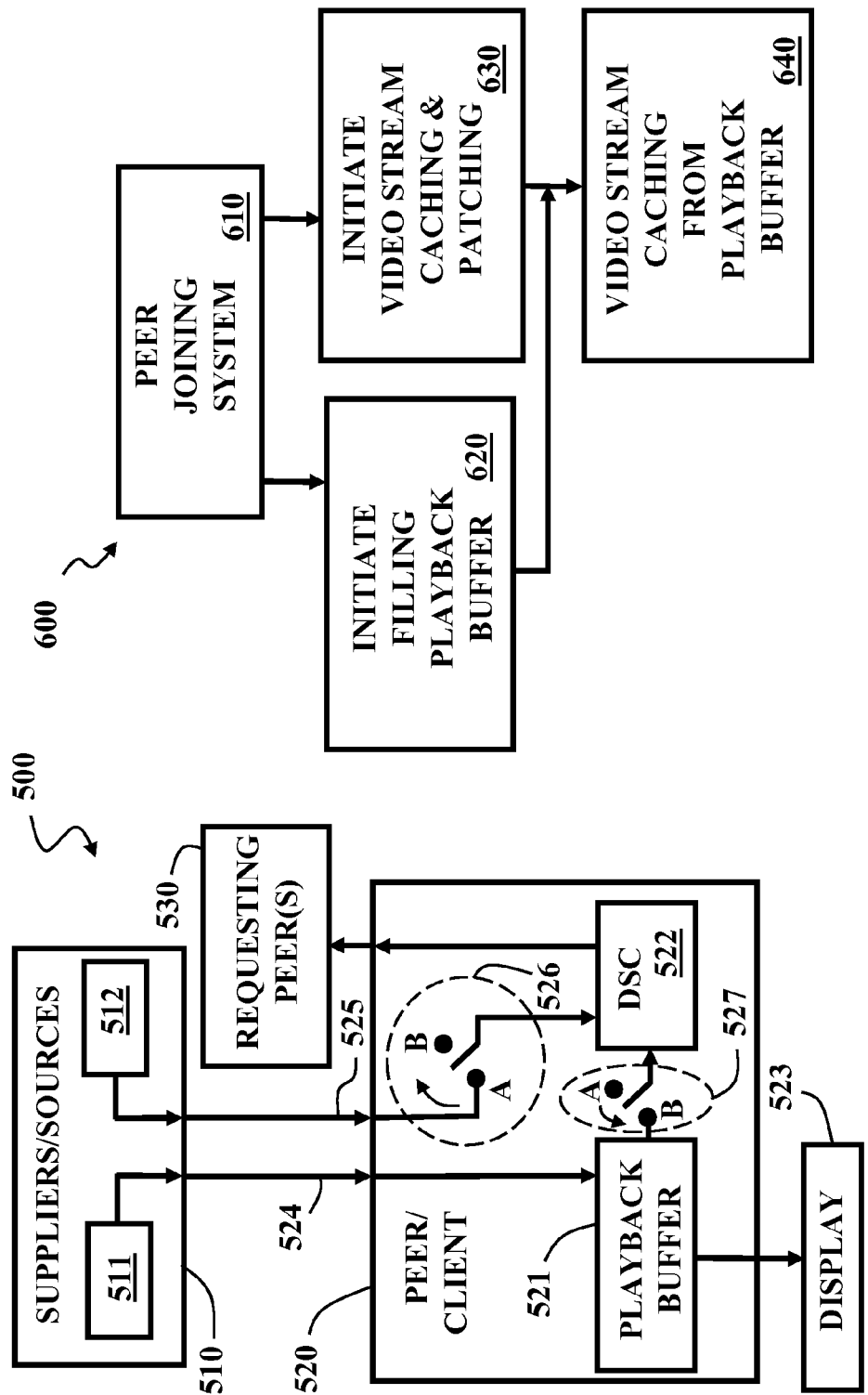

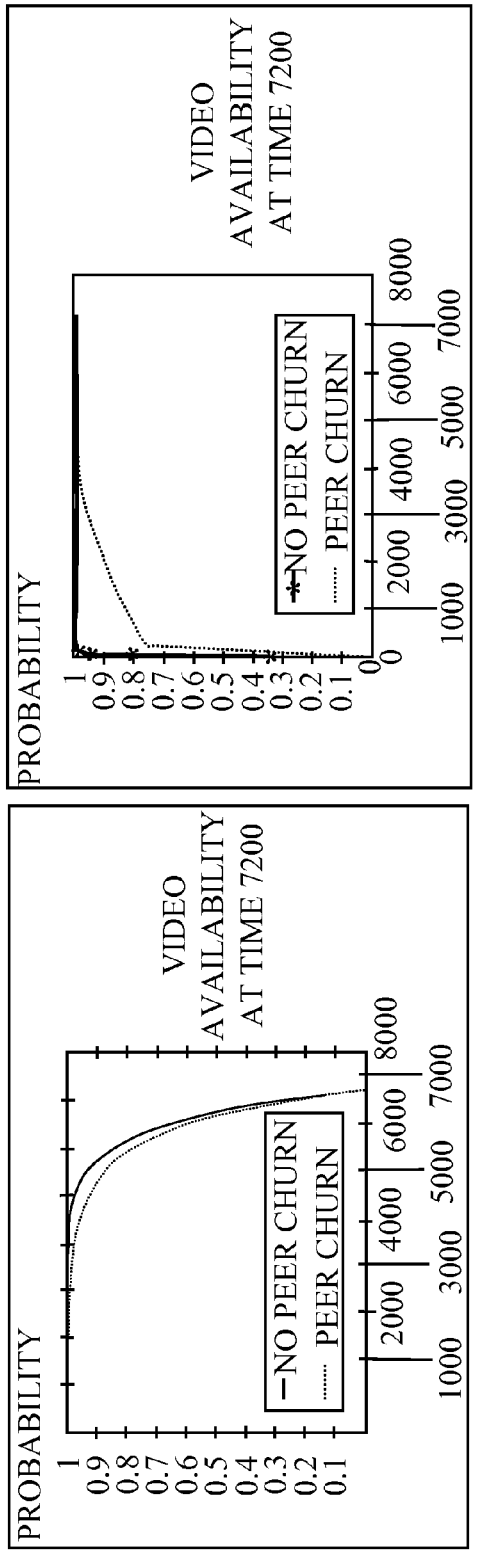
FIG. 23
FIG. 22
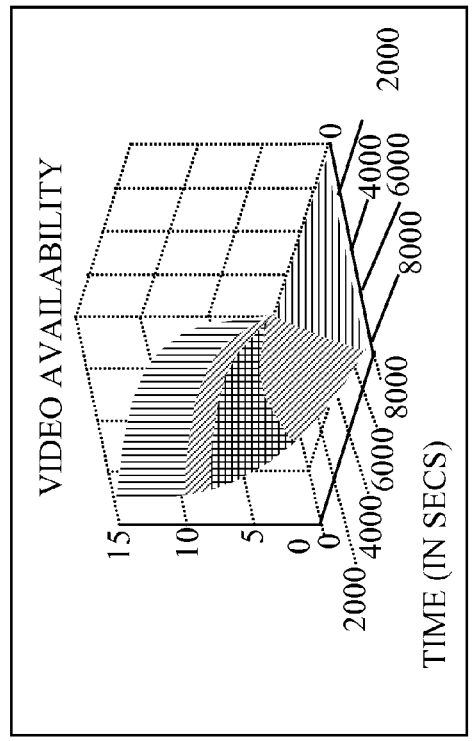
FIG. 24

DISTRIBUTED CACHE ALGORITHMS AND SYSTEM FOR TIME-SHIFTED, AND LIVE, PEER-TO-PEER VIDEO STREAMING

CROSS-REFERENCE TO RELATED APPLICATIONS

This application is related to patent application Ser. No. 11/933,723, filed Nov. 1, 2007.

FIELD OF ENDEAVOR

The invention, in its several embodiments, is related in general to multi-computer data transferring and is particularly related to computer-to-computer data streaming by providing methods and systems for supporting live and time-shifted streaming via distributed caching in peer-to-peer systems.

BACKGROUND

Video on demand (VoD) streaming systems allow users to receive and watch video content over a network. The state of the art presently includes the peer-to-peer media streaming systems that support only live-streaming. The state of the art also includes systems that only support sequential VoD streaming, such as "P2Cast" and "P2VoD." That is, users that join the system can watch the content only from the beginning, i.e., starting at timeline position 0 (zero). A system such as P2VoD may presume that every peer has the same buffer size and restrict peers to a limited use of a portion of their buffers in order to keep consistency among peers of the same generation. A system such as P2Cast relies on each peer to have sufficient size of storage and requires every peer prefetch future portions of the video using a multicast channel. Accordingly, prospective peers having unacceptably restrictive or limited buffer capacity may be unable to join a P2Cast system. For prospective peers, as clients, able to cache 10% of a stream's video length, P2Cast systems purport to be scalable and accommodating of such prospective peers. In P2VoD and P2Cast systems, peers that join early in relation to the start of a video stream, i.e., old peers of an earlier session, are not able to contribute their uplink capacity to the system. For example, in P2VoD systems, peers belonging to a session are not accessible from peers belonging to other sessions. As for P2Cast systems, peers that no longer have the first portion of the video are not able to support peers that newly join the system. In both these systems and exemplary instances, peers are precluded from contributing their excess available uplink capacity and their excess storage capacity to the system.

The state of the art also presently includes systems that support non-sequential access, such as "oStream." A system such as oStream has the system basing its search for a video supplier to be associated with a requesting peer based on predictions the system itself makes as to viewing duration for each requesting peer. An oStream system design may be scalable if each relaying node in the multicast tree is allowed to buffer on the order of 10% of the media stream.

SUMMARY

The exemplary embodiments of the present invention provide flexibility to clients desirous of viewing a live video stream in real time (or near real time) or a time-shifted playout of such a video stream over a packet transmission network. The embodiments of the present invention provide for the management of video packets stored across client stores to provide a client joining after the initiation of the live video stream with the flexibility of receiving the live or near real time stream of video packets from one or more source servers and/or one or more clients acting as peer video sources as coordinated by a registration/search server. In addition, the client joining after the initiation of the live video stream may be provided with the flexibility of receiving a complete, albeit time-shifted stream of video packets from one or more source servers and/or one or more clients acting as peer video sources as coordinated by a registration/search server.

For example, an apparatus embodiment may include: addressable memory comprising a playback buffer and a distributed stream cache; and a processing subsystem in communication with the addressable memory and configured to: receive a video caching policy via a packet transmission network; direct portions of a received video stream comprising a plurality of video packets to the playback buffer based on the video caching policy; and transmit, via the packet transmission network, portions of the video stream based on the contents of the distributed stream cache and based on the video caching policy. The processing subsystem may be further configured to copy video packets directed to the playback buffer and direct the copied video packets to the distributed stream cache based on the video caching policy. The processing subsystem may be further configured to direct portions of the received video stream to the distributed stream cache based on the video caching policy. The processing subsystem may be further configured to registers with a server on the packet transmission network.

An exemplary server embodiment may include: addressable memory; and a processing subsystem configured to: (a) receive, via a packet transmission network, a registration by a first client having a distributed stream cache, the registration comprising video stream parameters associated with the distributed stream cache including a time span of a video stream stored in the distributed stream cache; and (b) receive, via the packet transmission network, a request for a video stream by a second client having a distributed stream cache. The processing subsystem may be further configured to (c) receive, via the packet transmission network, a registration by a third client having a distributed stream cache, the registration comprising video stream parameters associated with the distributed stream cache, including a time span of a video stream stored in the distributed stream cache; and (d) direct the second client to receive a portion of the video stream from the third client before the time span of the video stream stored at the first client elapses.

An exemplary system embodiment may include a plurality of processing nodes, where each processing node is connected directly or indirectly to a packet transmission network via a network link, such as an Ethernet cable or a wireless link, and where each processing node includes addressable memory of which a portion of the addressable memory is used as a video playback buffer and a portion of the addressable memory is used as a video stream cache that may be made available to other processing nodes as peers in the network and is termed a distributed stream cache; and each processing has a processing subsystem that is in communication with the addressable memory and processing subsystem which may be configured either by circuitry or by the execution of machine-readable instructions by one or more computing units of the processing subsystem, or combinations of both, to: receive a video caching policy via a packet transmission network; direct portions of a received video stream comprising a plurality of video packets to the playback buffer based on the video caching policy; and transmit, via the packet transmission network, portions of the video stream based on the contents of the distributed stream cache and based on the video caching policy; and a controller node comprising addressable memory; and a processing subsystem in communication with the addressable memory and configured, either by circuitry or by the execution of machine-readable instructions by one or more computing units of the processing subsystem, or combinations of both, to receive, via the packet transmission network, a registration by a first processing node, of the plurality of processing nodes, the registration comprising a first video packet stream delimiter associated with the distributed stream cache; and where the controller node may be configured to receive, via the packet transmission network, a request for a video packet stream having a second video packet stream delimiter by a second processing node, of the plurality of processing nodes; and may be configured to direct communication between the first processing node and second processing node based on the first video packet stream delimiter and the second video packet stream delimiter.

A method embodiment may include steps executed by one or more processing machines that include, and not necessarily in this order, the steps of : (a) filling a first client playback buffer with a portion of a video packet (VP) stream having a first VP stream time delimitation received from a VP source via a packet transmission network; (b) filling a first client distributed stream cache with the portion of the VP stream having the first stream time delimitation; (c) notifying a server of the portion of the VP stream having the first VP stream time delimitation stored in the first client distributed cache being available for access via the packet transmission network; (d) requesting to the server, by a second client having a second playback buffer, a portion of a VP stream having a second VP stream time delimitation; and, if the second VP stream time delimitation comprises the first VP stream time delimitation, then (e) filling the second playback buffer with a portion of the VP stream having the first stream time delimitation received from the first client via the packet transmission network. Optionally, the filling step of the first client distributed stream cache may comprise the step of copying the video stream portion having the first stream time delimitation stored in the first client playback buffer to the distributed stream cache of the first client. Also optionally, the filling step of the first client distributed stream cache may comprise the steps of: filling the first client distributed stream cache with a portion of the VP stream preceding the time delimitation of the first VP stream time delimitation from the VP source and then copying the video stream portion having the first stream time delimitation stored in the first client playback buffer to the distributed stream cache of the first client. Optionally, the filling step of the first client distributed stream cache may comprise filling the first client distributed stream cache with the VP stream from the VP source.

BRIEF DESCRIPTION OF THE DRAWINGS

The present invention is illustrated by way of example and not limitation in the figures of the accompanying drawings, and in which:

FIG. 5 is a functional block diagram of an exemplary client, peer or processing node of the present invention;

FIG. 6 is a process flow block diagram of an exemplary client, peer or processing node of the present invention;

FIG. 22 is a graph of the expected video availability when peers leave the modeled Initial Play-out Position (IPP) policy of the present invention;

FIG. 23 is a graph of the expected video availability when peers leave the modeled LSP policy of the present invention;

FIG. 24 is a three-dimensional graph of the average number of peers available at time t, for video of position x; Np=100; D=240 s; under the modeled IPP policy of the present invention;

DETAILED DESCRIPTION

This invention, in its several embodiments, provides distributed caching in peer-to-peer systems supporting live and time-shifted streaming. The various system embodiments and methods of distributed caching embodiment have several features some of which include providing non-sequential video access and making efficient use of peer-side storage. For example, systems of the present invention may efficiently and fully utilize local storage capacity of each peer and the systems accommodate peers having differing maximum buffer capacity, and in turn systems of the present invention may efficiently exploit peer uplink capacity. Accordingly, the systems and methods may determine the required peer buffer capacity to achieve system scalability and attempt to lower the buffering requirements on each peer in the system for achieving scalability.

System, Device, and Method Embodiments

Figure 1:
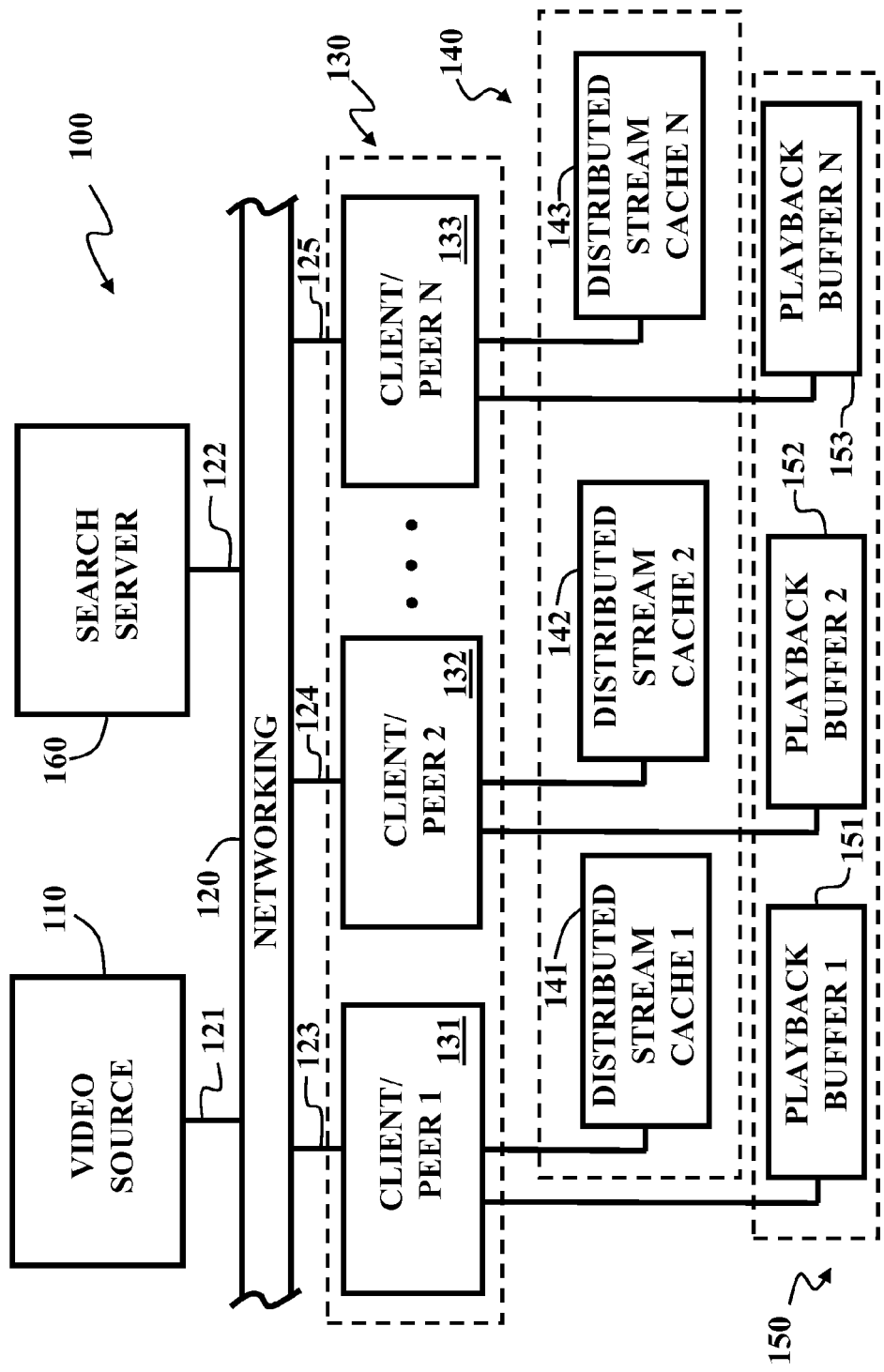
FIG. 1 is an exemplary system functional block diagram of an embodiment of the invention.

FIG. 1 is an exemplary system 100 functional block diagram of an embodiment of the invention. A video source 110 is shown connected via a network link 121 to a packet transmission network 120. Also shown connected to the packet transmission network 120 is a plurality of processing nodes 130 that may function as clients according to the client-server model and may function as peers in a peer-to-peer sharing of video content stored in a distributed stream cache 140 of each processing node as disclosed herein. In some embodiments, the video source 110 may be a device that originates a live, or real time, transmission of video packets over the packet transmission network. In other embodiments, the function of the video source 110 may be performed by one or more of the processing nodes 130. In processing received video packets for viewing, each processing node may have a playback buffer 150. For example, a first client or peer 131 may be connected to the network 120 via a network link 123 and thereby may receive video packets from a video source 110 for processing and display to a user. The received packets may be buffered in a playback buffer 151 and video packets from either the playback buffer 151 or directly from the video source 110 may be stored in a distributed stream cache 141. A processing node 131 registers the availability of the content of its distributed stream cache 141 with a search server 160 which may be connected to the network via a network link 122. If a second processing node 132 joins the network 120 via a network link 124 at a time after the first processing node 131 has joined, the second processor may fill its playback buffer 152 with either the live stream from the video source 110 or may be directed by the search server 160 to fill its playback buffer 152 with the contents of the of one or more distributed stream caches such as the first processing node distributed stream cache 141. The quantities of video packets or blocks of video frame may include time delimiters that enable switching, for example on directions from the search server 160, between the contributing processing nodes and the video source so that the second processing node 132 receives as much of the video stream as a user may indicate with as much continuity as the cached resource allows. For example, when a processing node 133 joins the network 120 via network link 125 later in time than both the first processing node 131 and the second processing node 132, the search server 160 may first direct the third, or later, processing node 133 to draw video packets first from the first processing node distributed stream cache 141 and, based on registered delimiters for the video packet time spans of both the first and second distributed caches 141, 142, may direct the third processing unit 133 to draw from the second processing node distributed stream cache 142 to fill its playback buffer 153 even before the contents of the first distributed stream cache 141 have been buffered by the third processing node 133. Accordingly, the third processing distributed stream cache 143 may be filled according to both the user indicated video delimiters and the caching policy.

Figure 2:
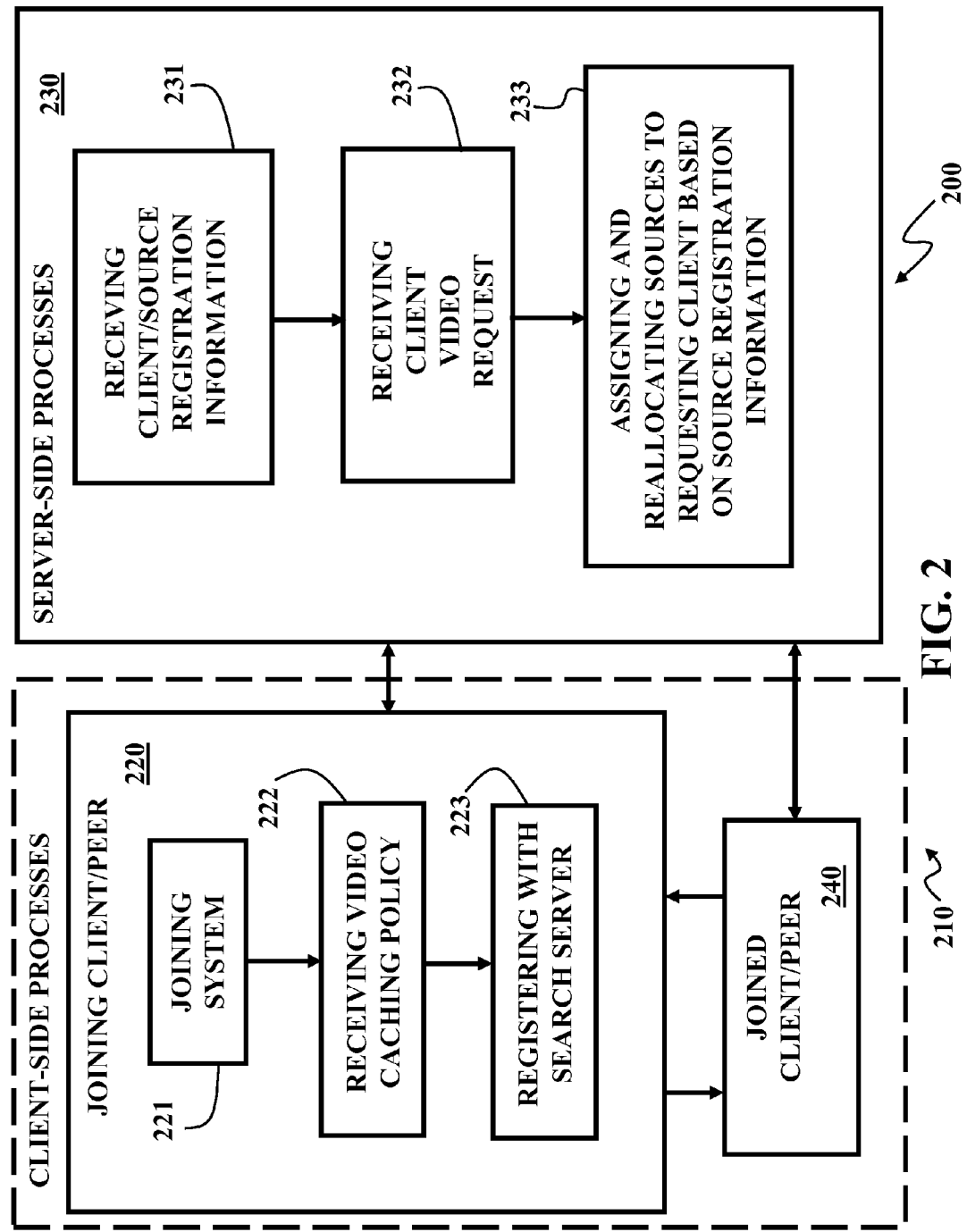
FIG. 2 is exemplary system process block diagram of an exemplary client-server model embodiment of the invention.

FIG. 2 is exemplary system process block diagram 200 of an exemplary client-server model embodiment of the invention. On the client side 210, a processing node such as a client 220 joins the system 221 by communicating with a video source such as a video server, an already joined client/peer 240, or another server, such as a search server 230. The joining client/peer receiving a video caching policy 222 and, as part of following the caching policy, registers 223 the availability of its cached video packets along with one or more time delimiters, such as the cached video portion start time or an equivalent packet or video block identifier and such as the cached video end time or an equivalent packet or video block identifier. On the server side 230, a processing node such as a server receives the communication from the client registering 231 the received information, such as the cached video identifiers of the client so that the client may be managed as a video source for a portion of the video stream. The server 230 receives a client video request 232 that may include video portion delimitation and searches the registration of the caches for videos sources that may cover in whole or in part the requested delimitation or range of video packets or blocks. Depending on the priority of allocation under which the server operated and availability, the server may select 233 one or more clients and/or an originating video source to be tapped to fulfill the request based on source registration information. The selection may be sent as directions to the requesting client to access a previously joined client 240 now operating as a peer to serve up its cached video.

Figures 3, 4:
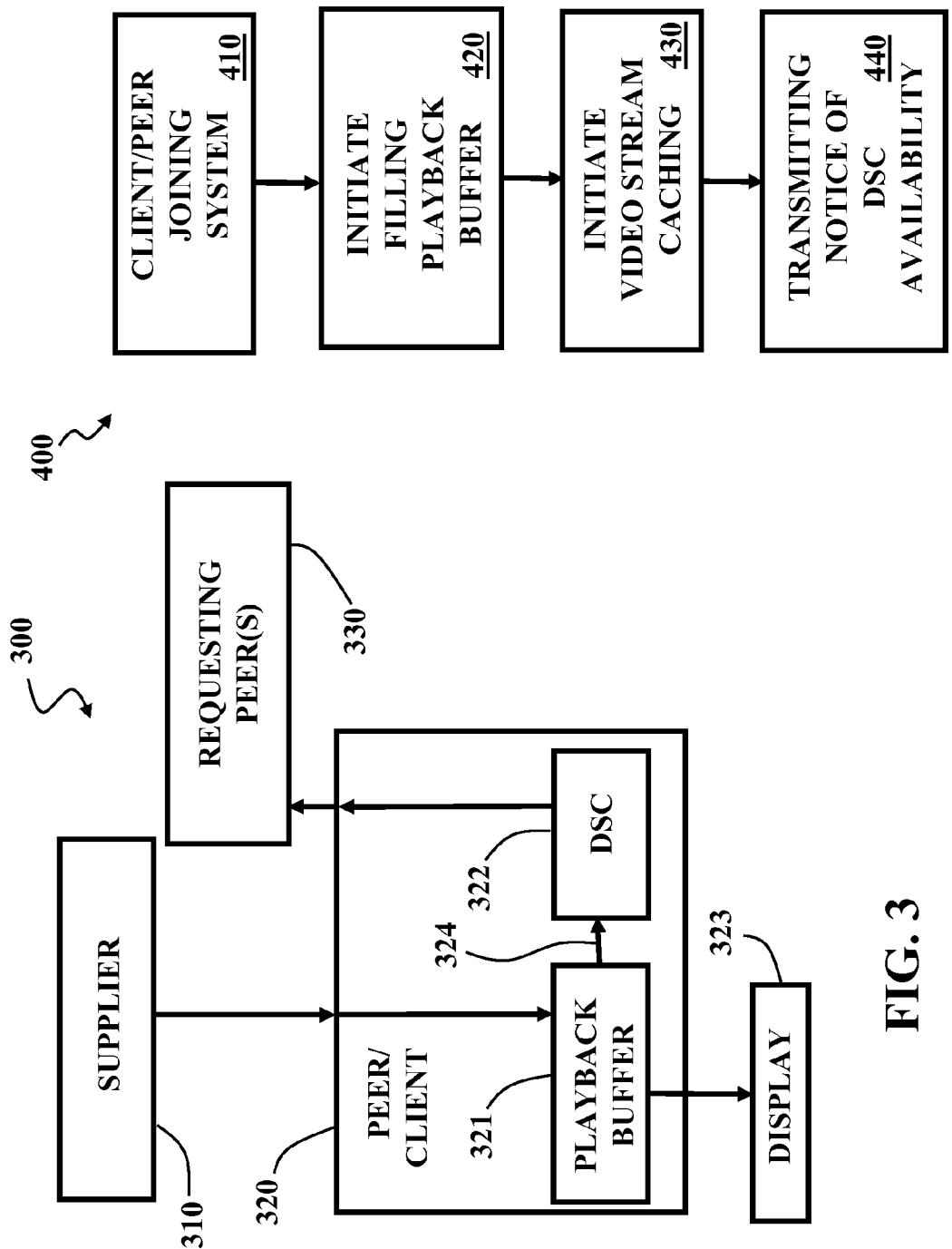
FIG. 3 is a functional block diagram of an exemplary client, peer or processing node of the present invention.
FIG. 4 is a process flow block diagram of an exemplary client, peer or processing node of the present invention.

FIG. 3 is a functional block diagram 300 of an exemplary client, peer or processing node of the present invention 320 and FIG. 4 is a process flow block diagram of an exemplary client, peer or processing node of the present invention 400. Referring to FIG. 3 and FIG. 4, as part of joining the system 410, the client 320 requests the video stream with sufficient start time delimitation or equivalent video block identification as part of the request to enable the system, via for example a search server, to identify a video source to act as the supplier 310. The supplier of video packets 310 may be an originating source of the video packet stream or a peer serving up a cached portion of the video packet stream. The processing node 320 has a playback buffer 321 and it is via the playback buffer 321 that the video packets are processed for display 323 to a user. Accordingly, the processing node 320, acting as a network client, directs the incoming video packets to its playback buffer 321 to initiate the filling 420 of the playback buffer. Either during or after the playback buffer 321 is filled, the video stream caching is initiated 430. In this example, content of the playback buffer is copied 324 to the distributed stream cache (DSC) 322 of the processing node 320 now acting as a network peer and a notification transmission 440 may be made to a search server as to the availability of the content of DSC 322 along with one or more parameters such as video initiation and/or duration delimiters, such as start time or an equivalent video block identifier, for the portion being cached. As the peer may be identified by a search server, the peer may serve up the cached video packets to one or more requesting peers 330.

FIG. 5 is a functional block diagram of an exemplary client, peer or processing node 500 of the present invention and FIG. 6 is a process flow block diagram 600 of an exemplary client, peer or processing node of the present invention. Referring to FIG. 5 and FIG. 6, as part of joining the system 610, the client 520 requests the video stream with sufficient start time delimitation or equivalent video block identification as part of the request to enable the system, via for example a search server, to identify video sources to act as the suppliers 510. A supplier of video packets 510 may be an originating source of the video packet stream or a processing node that has previously joined the network and, as a peer, serving up a cached portion of the video packet stream. The processing node 520 has a playback buffer 521 and it is via the playback buffer 521 that the video packets are processed for display 523 to a user. Accordingly, the processing node 520, acting as a network client, directs the incoming video packets via a first path or channel 524 from a first supplier or source 511 to its playback buffer 521 to initiate the filling 620 of the playback buffer. Simultaneously or while the playback buffer 521 is being filled, the video stream caching is initiated 630 via a second path or channel 525 from a second supplier or source 512. In this example, the distributed stream cache (DSC) 522 may receive from a second supplier or source 512 having a video stream start delimiter that precedes the video stream start delimiter of a first supplier 511 so as to patch behind in recorded time the output that will be available from the playback buffer 521 for copying to the DSC 522. Accordingly, the processing node 520 now acting as a network peer fills 640 its DSC 522 via the playback buffer 521 content once the start time delimiter of the video received by the second supplier or source 512 has caught up to the video time span of the first source 511. In this example, the first source and second source may be of the same processing node, but having two cached video portions of differing starting time delimiters. The second path or channel 525 may be broken as symbolized in FIG. 5 with the switches 526, 527 moving from position A to position B. A notification transmission may be made to a search server as to the availability of the content of the DSC 522 along with one or more parameters such as video initiation and/or duration delimiters, such as start time or an equivalent video block identifier, for the portion being cached. As the peer may be identified by a search server, the peer may serve up the cached video packets to one or more requesting peers 530, particularly cached video packets of the DSC 522 which will have a time span earlier than that viewed by the user via the display 523.

Figures 7, 8:
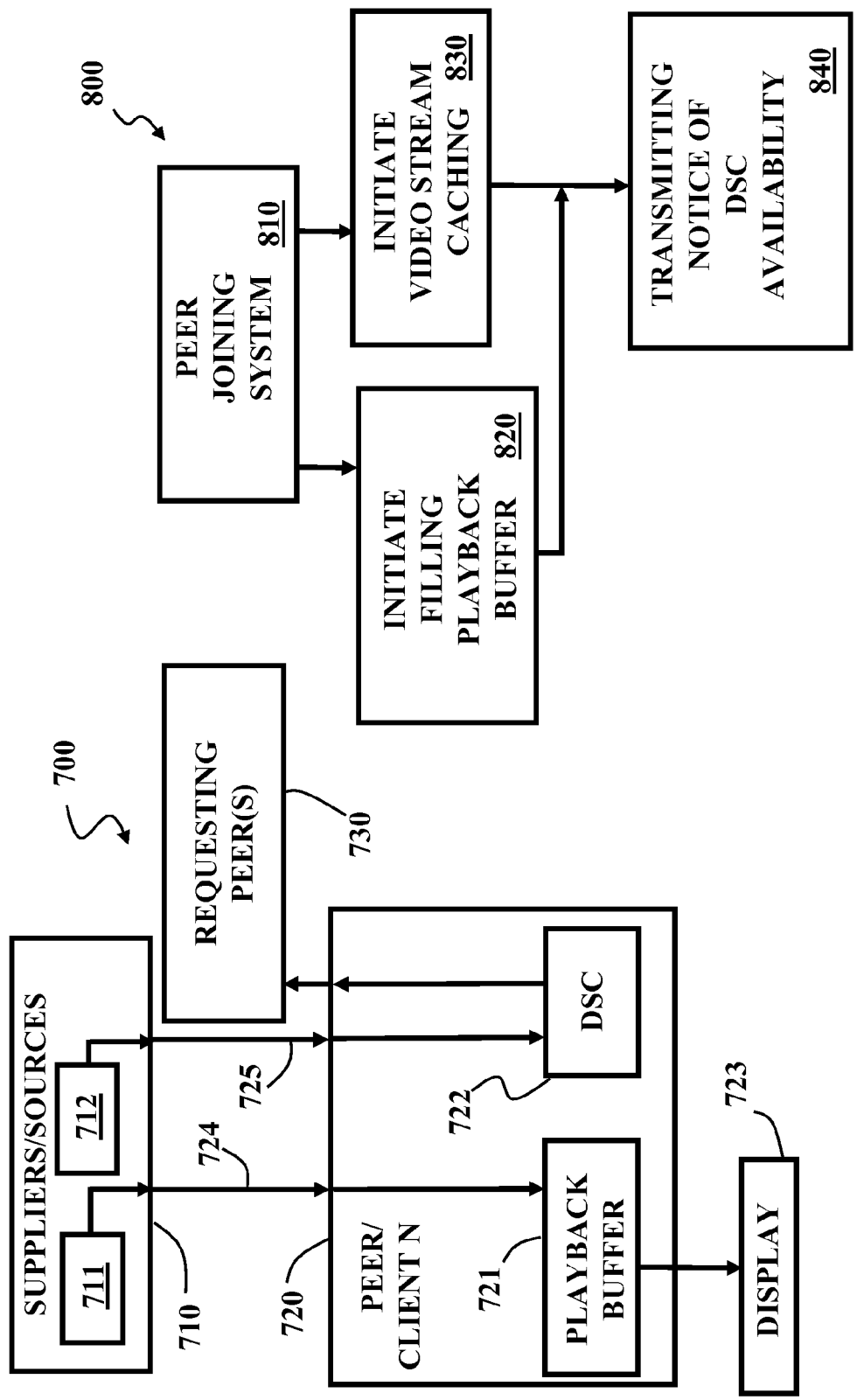
FIG. 7 is a functional block diagram of an exemplary client, peer or processing node of the present invention.
FIG. 8 is a process flow block diagram of an exemplary client, peer or processing node of the present invention.

FIG. 7 is a functional block diagram 700 of an exemplary client, peer or processing node of the present invention and FIG. 8 is a process flow block diagram 800 of an exemplary client, peer or processing node of the present invention. Referring to FIG. 7 and FIG. 8, as part of joining the system 810, the client 720 requests the video stream with sufficient start time delimitation or equivalent video block identification as part of the request to enable the system, via for example a search server, to identify video sources to act as the supplier 710. A supplier of video packets 710 may be an originating source of the video packet stream or a processing node that has previously joined the network and, as a peer, serving up a cached portion of the video packet stream. The processing node 720 has a playback buffer 721 and it is via the playback buffer 721 that the video packets are processed for display 723 to a user. Accordingly, the processing node 720, acting as a network client, directs the incoming video packets via a first path or channel 724 from a first supplier or source 711 to its playback buffer 721 to initiate the filling 820 of the playback buffer 721. Simultaneously or while the playback buffer 721 is being filled, the video stream caching is initiated 830 via a second path or channel 725 from a second supplier or source 712. In this example, the distributed stream cache (DSC) 722 may receive from a second supplier or source 712 having a video stream start delimiter that precedes the video stream start delimiter of a first supplier 711. Accordingly, the processing node 720 now acting as a network peer fills its DSC 722 via the supplier or source 712 and has caught up to the video time span of the first source 711 and transmits 840 a notice of DSC availability to, for example, a search server. In this example, the first source and second source may be of the same processing node, but having two cached video portions of differing starting time delimiters. Accordingly, the DSC 722 is made available to requesting peers 730.

The system supports non-sequential access of the content, i.e., access from any time on the timeline position until the current time, including access of the live stream of video. The system may operate by executing distributed cache algorithms for a peer-to-peer system that may support live and/or time-shifted streaming. The exemplary transmitted packets under consideration for the system include a media stream which is multicast as a live stream, i.e., in a fashion similar to live TV broadcast. For video stream and distributed stream caching, the live video stream may be denoted as V [0, T], where T is the current time. The video stream is presumed to have a constant bit-rate (CBR) and V [$\alpha,\beta$] denotes the part of the video streamed during time [$\alpha$, $\beta$]. Let V ($\alpha$) denote the video stream starting at time $\alpha$. For the live stream, T increases as the wall-clock time increases. Suppose a new peer, P, joins at time T. P can choose to watch the video at its current position, V (T), or at any position in V [0, T), which is made available during the current video session. If P chooses to watch the video from V (T), P is said to have connected to the live stream. If the peer chooses to watch it from V (x), where x is any position between [0, T), then P is said to have connected to the time-shifted stream.

A peer may be a computing node comprising a user interface, addressable memory that may store machine-readable instruction, or processor for executing the machine readable instructions. As part of the addressable memory or input/output storage sub-system of the computing node, a portion of a store may be allocated as a cache. For example, a disk cache, i.e., either a reserved area of random access memory (RAM) or a special portion or directory of a hard disk, may be used to store data for fast access. Also as part of the addressable memory or input/output storage sub-system of the computing node, a portion of a store may be allocated as a playback buffer which allows video processing at the local, or processing node level, to take place in a continual fashion.

An exemplary peer-to-peer, time-shifted and live, video streaming system (P2TSS) may include: (a) a video source; (b) participating peers, each having a distributed stream cache; and (c) a centralized search to locate supplier peers. In this example, the video source is the only source of media that has all stream content available from time zero to current time. Peers that want to watch the media stream join the P2TSS system. Peers participating in watching the media stream may also cache a portion of the video stream by way of their respective local storage where the cached portion in a peer is referred to as a distributed stream cache (DSC). The exemplary P2TSS system executes steps according to machine-readable instructions that may be termed distributed cache algorithms (DCA). These algorithms, when executed as steps of machine-readable code, are methods for governing the allocation of portions of the video for storing by the peers in each of their respective DSCs. Accordingly, an aggregate of such DSCs function as a distributed storage of the single media stream that may be accessed by the participating peers.

In the exemplary P2TSS system, peers contribute to the system with their storage as a DSC and with their uplink bandwidth as a stream forwarding service. To find a particular video segment in the distributed storage, a central search is used. For central search, one or more search servers may be employed to process requests from the peers such as registration of video segments (contained in their DSC) and lookup of video segments.

In the exemplary P2TSS system, a peer has two separate buffers: a playback buffer and a distributed stream cache. A playback buffer stores video packets that may be played back at the peer. The size of the playback buffer may be determined by the network jitter and other factors such as a distributed cache policy. The distributed stream cache, or DSC, may store video segments that in turn may be shared and supplied to other peers. The DSC size of peer $P_i$ may be represented as $D_i$. Peers may have differing sizes of their respective DSC and this may be due to variation in the capacity of their individual memory stores or other variations in real world hardware constraints. A representation of a common size of DSC among peers may be represented as D and facilitate the description of distributed caching.

A video stream comprises blocks of video frames where the block size is related to the quantization interval of the stream which may be represented by the system parameter Q. The video, V [0, T], may be represented as a set of blocks $$\bigcup_{i=0}^{\lceil T/Q \rceil - 1} B_i,$$

where $B_i$ is the $i^{th}$ block in the stream that covers V [iQ, (i+1)Q).

Distributed Caching

In this section, two distributed cache algorithms are described: Initial Play-out Position (IPP) Caching and Live Stream Position (LSP) Caching, which, when executed as machine-readable instructions, may be used as methods to determine DSC contents for each of the peers in the exemplary system. When a peer joins the system and depending upon the particular peer-to-peer joint protocol, the joining peer may contact either the video source or one of the participating peers. At that time and by such a contact, the joining peer may be notified as to a video caching policy (such as IPP or LSP) that it should follow. When executing the IPP policy, a peer may cache the portion of the video stream starting with its own initial playback position. When executing the LSP policy, a peer may cache the portion of the video stream starting with the most recent live stream position.

Initial Playback Position Caching

When a peer, P, joins the exemplary time-shifted video streaming system of the present invention, it may be presumed that the joining peer intends to watch the video stream V (L) where 0≦L≦T. In order to join, the prospective consumer peer must find a supplier to deliver the video stream from L. A supplier, in this example, is a peer that supplies packets from its distributed stream cache (DSC) to a consumer peer.

When P starts to receive video packets that belong to a set of blocks $$\bigcup_{i=0}^{\lceil T/Q \rceil - 1} B_i$$

in its playback buffer, the video packets may be copied to the DSC. P may cache the stream until its DSC is filled entirely with video frames delivered from its supplier. By referring to the DSC size of the peer as D, the amount of video blocks stored may be represented as:

$$DSC(P) := \bigcup_{i=\lceil L/Q \rceil}^{\lceil (L+D)/Q \rceil - 1} B_i \quad [\text{Eq. 1}]$$

Due to the quantization of the video stream, the filling of the DSC begins at time $$T + Q \lceil L/Q \rceil - L$$

and finishes at $$T + Q \lceil L/Q \rceil - L + D.$$

Figure 9:
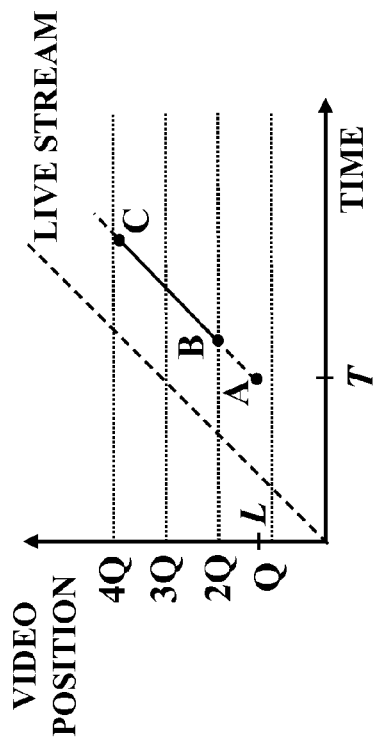
FIG. 9 is an exemplary time-video diagram for DSC-filling for a peer.

FIG. 9 illustrates an exemplary video trajectory of a peer, as well as, the filling process of its DSC. Suppose peer, P, arrives at the system at time T having a DSC capacity, D, of 2Q, and that P wishes to watch the video from position L, which is between Q and 2Q. Accordingly, from time T (point A), the peer starts to receive the video from position L (point A) and when the stream reaches $$2Q \left( = \lceil L/Q \rceil \right)$$

at time $$T + Q \lceil L/Q \rceil - L, P$$

starts to fill its DSC (point B) and continues to fill the cache until the cache becomes full (point C). Once the cache is full, the cache content remains static until P acts to change it.

Figure 10A:
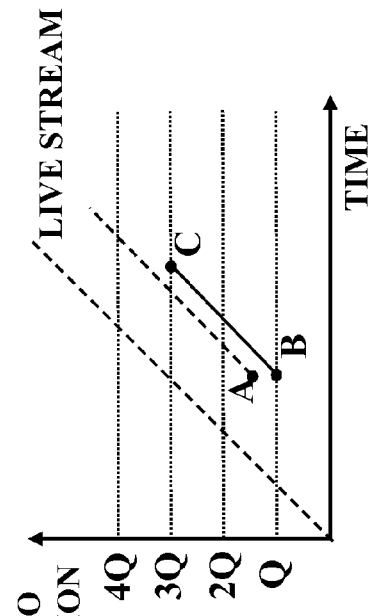
FIG. 10A is an exemplary time-video diagram for a single connection for cache filling.
Figure 10B:
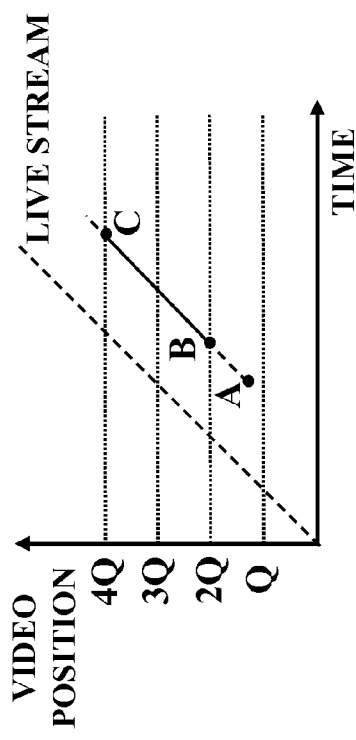
FIG. 10B is an exemplary time-video diagram for a dual connection for cache filling.

FIGS. 10A and 10B respectively depict two exemplary schemes of cache filling approaches under the Initial Playback Position (IPP), namely "Scheme A" and "Scheme B." Scheme A may be illustrated by FIG. 10A where the DSC caches V [2Q, 4Q) and a single connection is sufficient to retrieve the video stream for both the playback (point A) of a peer and the filling of its DSC (points B to C). Scheme B may be illustrated by FIG. 10B where the first block used to fill the cache contains the video portion starting at V (L) (point B). With this scheme, the DSC stores the blocks $$\bigcup_{i=\lceil\frac{L}{Q}\rceil}^{\lceil\frac{L+D}{Q}\rceil} B_i.$$

Also via Scheme B, a connection is opened for playback of the peer (point A) while another connection is established to fill its DSC (point B) in order to patch the missing part of V[Q,L). If a supplier has sufficient uplink bandwidth to support both connections, the peer need only connect to the supplier. Once the missing portion is patched, the second connection is torn down and P uses the remaining connection for its playback buffer.

When Scheme A is applied, there may be few peers that hold the first block of the stream, $B_0$, if many peers chose to watch the video from position x, x>0. This sparse first block caching may be ameliorated via the application of Scheme B. When applying Scheme B, a peer may open another connection for patching and/or may request more bandwidth from the supplier than the necessary bandwidth for playback only connection.

Live-Stream Position (LSP) Caching

Under the LSP caching policy, when a peer, P, joins the system, P caches the most recent portion of the stream regardless of its choice of the starting position of the video. To make the DSC of P available to other peers as soon as possible, P may open an additional network connection. That is, P may have open concurrently two network connections in parallel: (a) a first network connection for retrieving the portion of its own video playback; and (b) a second network connection for filling up its DSC. In addition, peers under the LSP policy are allowed to download from an incomplete DSC of a supplier. Incomplete DSCs are the caches that are still being filled with video streams until they are full. Under the LSP caching policy, peers may notify the system of their incomplete DSCs. In this way, peers that are filling up their distributed caches form an implicit multicast tree structure.

Assuming P joins at time T, P's DSC of size D caches:

$$DSC(P) := \bigcup_{i=\lceil\frac{L}{Q}\rceil}^{\lceil\frac{L+D}{Q}\rceil-1} B_i.$$

Figure 11A:
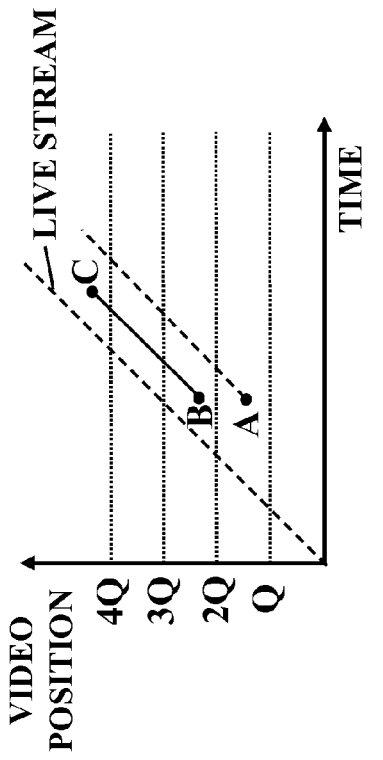
FIG. 11A is an exemplary time-video diagram for a cache filling when a peer connects to the live stream multicast.

Accordingly, DSC filling may be applied to cache any portion of the video stream. FIG. 11A is an exemplary time-video diagram for a cache filling when a peer connects to the live stream multicast.

Figure 11B:
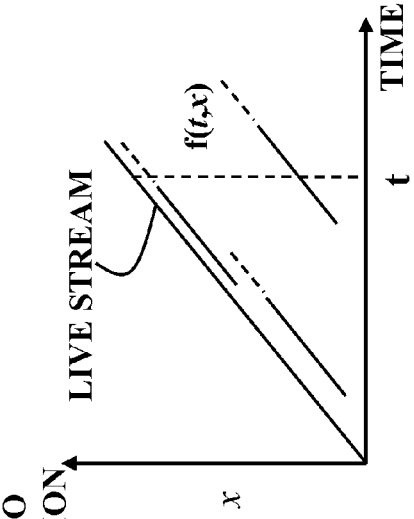
FIG. 11B is an exemplary time-video diagram for a cache filling when a peer connects to the pseudo-live stream multicast.

Since newly joining peers under the LSP policy will be caching the video portions that are temporarily correlated, they tend to form a group until they finish filling up their respective caches and leave the group. One may term this group of peers as being a pseudo-live stream multicast group, because the content they deliver to each other is nearly the most recent portion of the stream, called "live stream." The cache content and the start and end time of cache filling are depicted in FIG. 11B. As depicted in the diagram, the cache filling starts immediately as soon as the peer finds a parent (or supplier) from the block $$B_{\lfloor\frac{T}{Q}\rfloor}.$$

Note that peers that join at time between $$Q_{\lfloor\frac{T}{Q}\rfloor} \text{ and } \lceil\frac{T}{Q}\rceil$$

begin to fill the cache with $$QB_{\lfloor\frac{T}{Q}\rfloor}.$$

Accordingly, parents (or suppliers) shift the stream in time to deliver their children (or consumers) the stream from the $$B_{\lfloor\frac{T}{Q}\rfloor}$$

block. In that sense, the pseudo-live stream multicast participants function differently from the typical live stream multicast where intermediate entities immediately forward packets they receive to the next entity. However, peers may also form a live-stream multicast in order to fill their caches. FIG. 11A illustrates cache filling based on a live-stream multicast. Peers that join at a time between $$\lfloor\frac{T}{Q}\rfloor \text{ and } \lceil\frac{T}{Q}\rceil,$$

join the multicast overlay. Once they are connected to the overlay, they may stay silent before they start to fill their caches. Alternatively, they can help other peers in the overlay deliver the stream using their own uplink capacity. At time $$\lceil\frac{T}{Q}\rceil,$$

they all start to fill their caches synchronously. Contrary to the pseudo-live-stream multicast, peers leave as a group when their caches are filled completely.

Peer Supplier Selection

Disclosed thus far are the two exemplary distributed cache algorithms, which when executed as machine instructions are methods or processes to allow peers to contribute to the overall system with their storage capability. Presently disclosed in this section are exemplary methods by which peers may find other peers holding video segments the searching peers wish to retrieve. A foundational basis for the system and methods of the present embodiments rests on a server-client model. For example, a search server may be placed in the network so that peers may register to the server the information on their cache contents and query video blocks to retrieve.

Peers may register themselves to the server when they finish caching the first video block at the cache. The information sent to the server may include the IP address, optionally the TCP or UDP port number, the ID of the first block in the cache, and the cache size. Peers may query the server about the location of video segments they seek to retrieve. The registration information received from peers may be stored and addressed subsequently by the server later in order to process peer queries. Accordingly, when acting on a received query, the server may search for peers that have registered as holding the requested video blocks.

Switching to the Next Supplier

Suppliers (or parents) deliver video packets to consumers (or children) from their cache. Since a supplier's cached stream is limited, a consumer peer may need to switch to another supplier. It is usually the case when the peer is retrieving video for playback, contrary to cache filling which usually finishes when the cache gets filled. Since the cache size of the peer's current supplier is known, the peer can start to search for the next supplier ahead of time. This action is called proactive switching, because the action can be taken before the current supplier stops delivering packets after its cache contents are completely delivered. The time assigned to when proactive switching starts may be a value predetermined by averaging the time of the search operation. Once the proactive switching is done, seamless video delivery may be made when the next supplier starts to deliver later video blocks when the previous supplier is near the end of delivering video.

Forming a Live-Stream Multicast

The description thus far has addressed the repository for the video stream as either a DSC of the peers or the video source. Supplier peers may deliver video packets to other peers from their respective DSC. The video source has the whole or entire stream that is made available. When there are many peers that want to watch the live stream, most of them need to connect to the video source because few peers will be available for their requests. This limitation in source may be attributed to the necessary amount of time required for peers to become available to other peers. In addition, there may be only a few peers caching the live stream or pseudo-live stream. To reduce the source's burden, it may become necessary to decrease the number of connections to the video source. An exemplary method of letting the source avoid many requests on the live stream is to facilitate peers forming a multicast group—where peers receive and forward the live stream to each other. When peers form a multicast overlay, they each may use their playback buffer in addition to their DSC, to store and forward video packets. Because peers may be interested to receive the live stream as soon as possible, it may be desirable to build a low-latency overlay to form a multicast group among peers who seek to receive the live stream.

Initial Playback Position Caching Model

In modeling the initial playback caching process, one computes the probability of video availability among peers at an arbitrary time. The video availability among peers indicates that at least one peer can provide a requested position of stream to other peers, which is desirable for scalable system capacity. The video availability is affected by many factors such as the size of the distributed stream cache, number of peers, and the cache policy.

Under the IPP policy, peers cache the stream segment from their initial playback position. The cache fill is done when the distributed stream cache, or DSC, becomes full. For explanatory purposes, one may presume peers each have similarly-sized distributed stream caches, D. For explanatory purposes in this example, the time unit may be seconds and accordingly the DSC size may be expressed in seconds. Let us assume the time unit is in seconds. In this section, peers are presumed to not leave the system after they join the system. This presumption may be relaxed below to allow for peer churns, or peer turnover. In order to capture the presumed random arrival rate, peers are presumed to join the system according to the Poisson distribution of rate $\lambda$.

If the size of Q is sufficiently small, then peers may begin to fill their respective DSC soon after they each begin to receive the video stream. Otherwise if Q is not negligible, peers need to wait until the next quantized starting point before filling their respective caches. Also, if the size of Q is small, the system may experience fewer collisions for storing the same video segment because the probability that more than one peer joins the system in an interval of Q becomes lower as its size decreases. Accordingly, the explanatory model has a relatively small Q and presumes no collisions.

Figure 12:
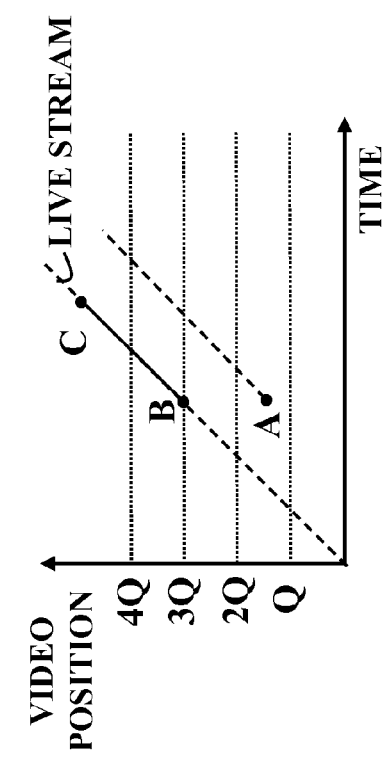
FIG. 12 is an exemplary time-video diagram of a peer arrival.

A time-video diagram is shown in FIG. 12. This diagram depicts the DSC contents of peers and the playback position of the peer where the video stream is presumed to have a constant bit rate. The first sloped line represents the live stream 1210. The diagram of FIG. 12 illustrates that a peer joins at time t. At time t, the video of [0, t] is available. Peers are assumed to access any available position randomly when they join. Video position x is the initial playback position of the joining peer. Under the IPP policy, the joining peer fills its DSC starting from x. Since its DSC size is D, the content stored in the DSC after time t+D is the video of [x, x+D], which is denoted by the second sloped line 1220. The third sloped line is a dashed line representing the trajectory of the peer view of the peer over time 1230.

Figure 13:
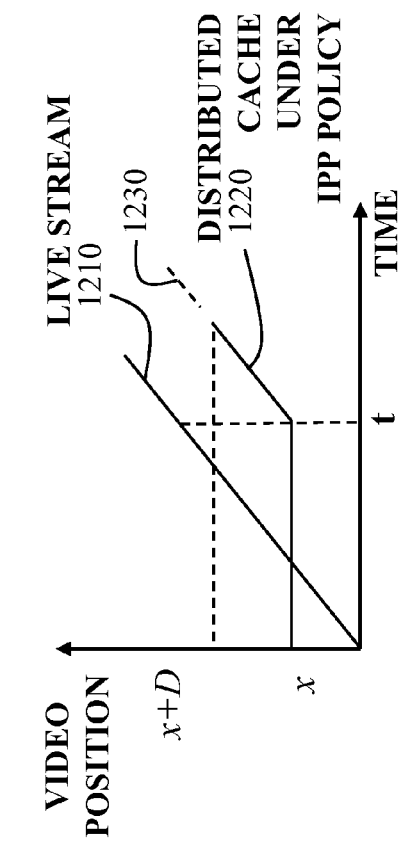
FIG. 13 is an exemplary time-video diagram of three peers where $A_k$ is zero because no video of position x is available among peers at time t.

The probability of video availability of position x at time t may be represented by a function f(t,x). FIG. 13 is an exemplary time-video diagram of three peers where $A_k$ is zero because no video of position x is available among peers at time t;

$Pr\{x$ is available at time $t\} = Pr\{$at least a peer covers $x$ by time $t\} =$ $$\sum_{i=1}^{\infty} Pr\left\{\sum_{k=1}^{i} A_k \geq 1 \mid N(t) = i\right\} Pr\{N(T) = i\} =$$

$$\sum_{i=1}^{\infty} \left\{1 - Pr\left\{\sum_{k=1}^{i} A_k = 0 \mid N(t) = i\right\}\right\} e^{-\lambda t} \frac{(\lambda t)^i}{i!} =$$

$$\sum_{i=1}^{\infty} \left\{1 - \prod_{k=1}^{i} Pr\{A = 0\}\right\} e^{-\lambda t} \frac{(\lambda t)^i}{i!}$$

Where $A_k$ is an indicator variable that has 1 (unity) when a $k^{th}$ peer contains video of position x, arriving between time 0 (zero) and T. If the peer does not cover x, then $A_k$ is 0. The function N(t) is a Poisson process having rate $\lambda$, $\lambda > 0$. The last step is based on several reasons: First, in order for $$\sum_{k=1}^{i} A_k = 0$$

=0 to be possible, $A_k$=0, k=1, i, are needed. Second, given N(t)=i, the n arrival times of peer k, $S_1, \ldots, S_n$ have the same distribution as the order statistics corresponding to n independent random variables uniformly distributed on the interval (0, T). Lastly, the covering by each peer of x is independent of each other (i.e., peer-independent). Event A is an event where a peer that arrives between 0 and T does not cover x.

Figure 14:
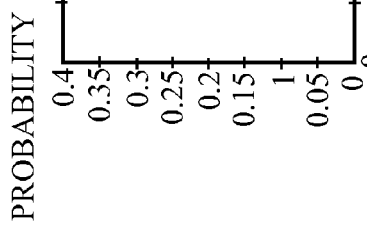
FIG. 14 is a graph illustrating the arrival time and initial play-back position covering video of position x.

Obtaining Pr{A=0} is as follows:

$$Pr\{A = 0\} = \int_0^t Pr\{x \text{ not covered} \mid \text{arrival at } S\} f(S) dS$$

$$= \int_0^t \{1 - Pr\{x \text{ not covered} | \text{arrival at } S\}\}\left(\frac{1}{t}\right)dS,$$

where f(S) is a probability density function of the arrival time. It may be represented as a uniform distribution over [0, t] as discussed earlier. To arrive at a representation of Pr{ x covered|arrival at S}, one may apply the diagram in FIG. 14. In addressing this figure, suppose a peer arrives at time S, 0≦S<t. Under the IPP policy, the peer may choose any position randomly between 0 and x. Covering of the video of position x is determined by the following rule depending on S and its initial position:

(a) An area surrounded by (t, 0), (t–D) and C(t, x) represents a region where peers join and start to watch video, yet their DSC either has not reached x or is filled before the video passes position x. An area below the line connecting B(x–D, x–D) and (t, x–D) is where a peer starts to fill up the DSC too early that the DSC is unable to cover x due to a size limit; and (b) An area above the line connecting A(x, x) and C(t, x) is where a peer starts filling its DSC after x, thus not covering x. Therefore, the area surrounded by A, B, C, and D is the only area where a peer can store x.

Given S (0≦S≦t), $$Pr\{x \text{ is covered} | \text{an arrival at } S\} =$$

$$\begin{cases} 0, \min(x, S) \le \max(0, x - D, S - (t - x)) \\ \frac{\min(x, S) - \max(0, x - D, S - (t - x))}{S}, \text{otherwise} \end{cases}$$

Figure 15:
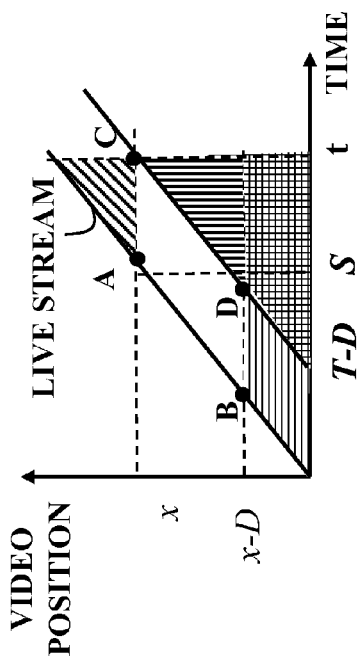
FIG. 15 is a graph of the modeled probability of covering video.

FIG. 15 illustrates the above function in a graph at time 1000 (s) for a video of position 600 (s). D is set to 240 (s) and the arrival time S ranges from 0 to 1000. The graph indicates that any peer arrival before 360 s, or after 1000 s, cannot be available at time 1000 in serving the video of position 600. The peak occurs at 600 s, with the value of 0.4. In other words and in this example, 40% of peer arrivals at time 600 s will be available in serving the video of position 600 depending on the initial play-out position of the peer.

Figure 17:
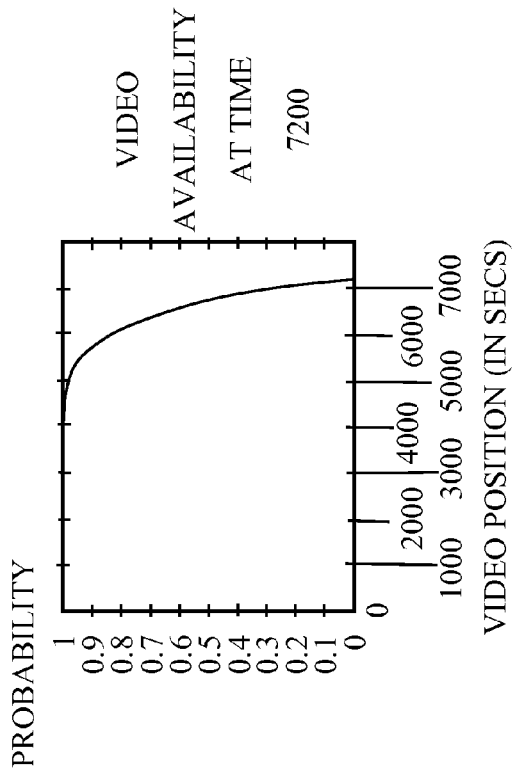
FIG. 17 is a graph illustrating the modeled video availability at time 7200.
Figure 16:
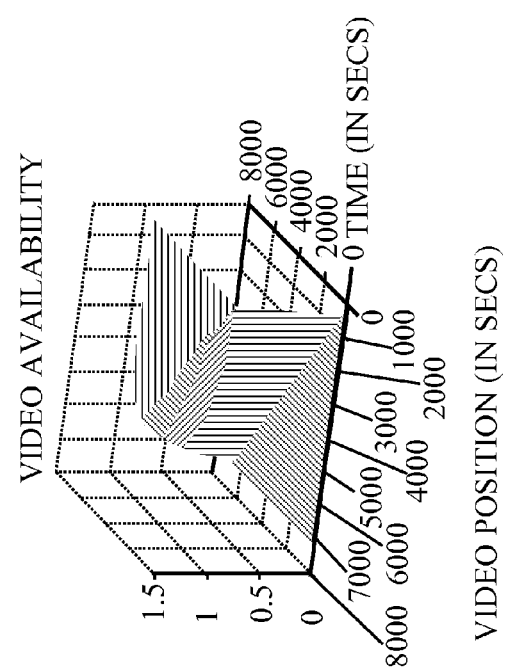
FIG. 16 is a three-dimensional graph illustrating the modeled data availability in time-video plane under the Initial Playback Position (IPP) cache policy where the video is 7200 seconds long and no peer churn occurs.
Figure 18:
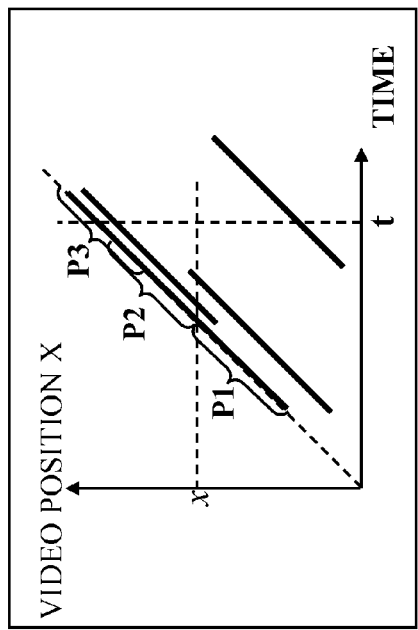
FIG. 18 is a graph illustrating the modeled availability of video of position 100.

FIG. 16 illustrates the prediction from the model above with the same parameters as in FIG. 15 when number of peers (Np) is 100. FIG. 17 is a bisection of FIG. 16 at time 7200. The graph of FIG. 17 shows the early part of the video is available with probability 1. However the availability drops rapidly towards the end. This modeled rapid drop reflects the fact that later peers have a large range of choice for initial playback position, thus resulting in fewer peers caching the later part of the video. FIG. 18 shows the availability of video of position 100. The position becomes available when the live stream reaches it at time 100. Then, it becomes available with probability 1 after time 200.

Live-Stream Position Caching

Figure 19:
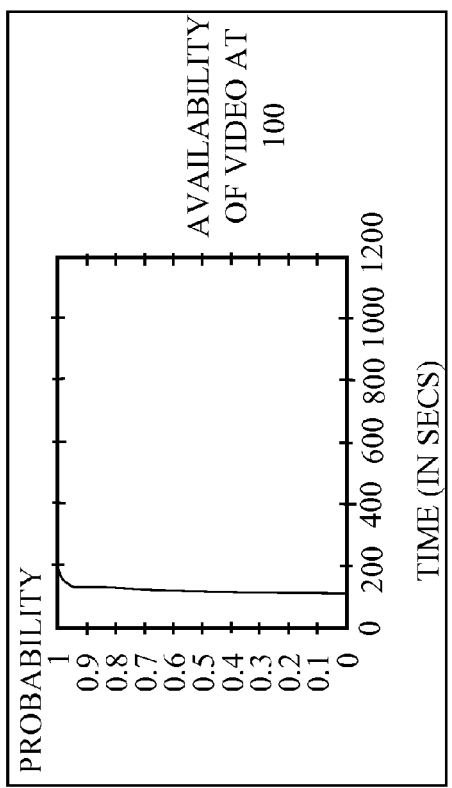
FIG. 19 is an exemplary time-video diagram of three peers under the Live Stream Position (LSP) policy of the present invention.

Under the live stream caching policy, peers cache the live stream. In FIG. 19, P1 represents the contents of the DSC of peer P1 as well as when the cache starts filling and finishes filling its contents. P2 represents the contents of the DSC of peer P2 as well as when the cache starts filling and finishes filling its contents. P3 represents the contents of the DSC of peer P3 as well as when the cache starts filling and finishes filling its contents. Note that there is overlap between P2 and P3, thus proving more availability on the corresponding video segment.

Let f(t, x) denote the probability of video availability of position x at time t. In this example of LSP caching, f(t, x) has the same form as the model for IPP caching. Under the LSP policy, a peer may arrive, i.e., join, at time S, 0≦S<t and once it joins, the peer begins caching the live stream. It follows then that in order to cover video of position x, a peer needs to arrive before time x. In addition, for a peer to not exceed its DSC size limit in this model, the peer would arrive after x–D. If x<D, then there is no lower limit for peer arrival time.

Given S, where 0≦S<t, $$Pr\{x \text{ is covered} | \text{an arrival at } S\} =$$

$$\begin{cases} 0, \min(x, S) \ge \max(0, x - D, S - (t - x)) \\ 1 - \frac{\min(x, t) - \max(0, x - D)}{t}, \text{otherwise} \end{cases}$$

Figure 21:
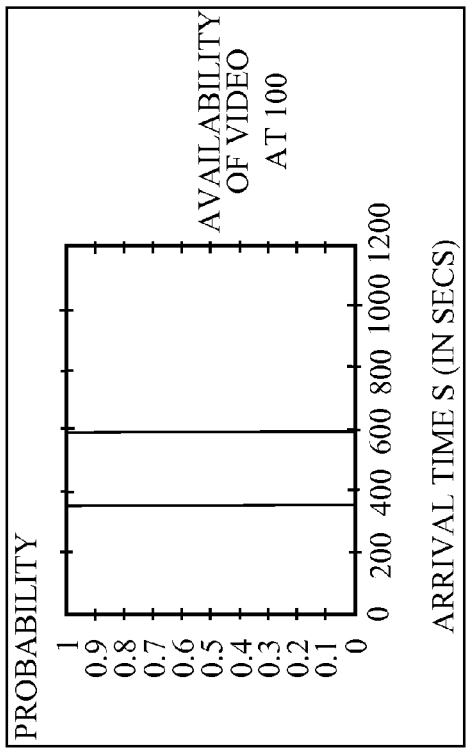
FIG. 21 is a graph of the modeled probability of covering video.
Figure 20:
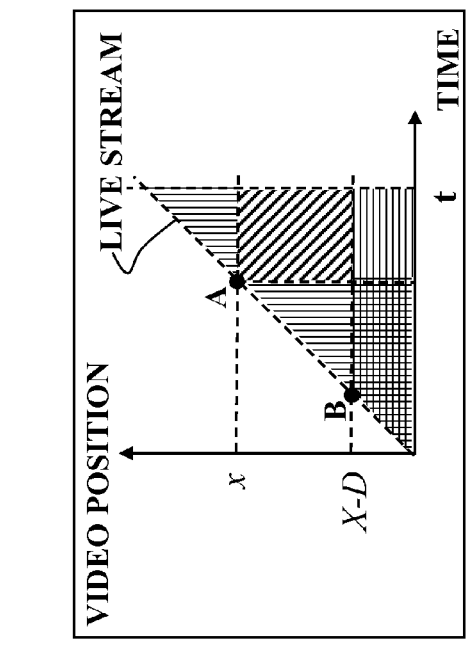
FIG. 20 is a graph illustrating the modeled arrival time and initial play-back position covering video of position x.

FIG. 20 is a graph illustrating the modeled arrival time and initial play-back position covering video of position x. FIG. 21 illustrates in a graph the probability from zero to a time of 1100 (s), for a video of position 600 (s). D is set to 240 (s) and the arrival time S ranges from 0 to 1100. When a peer arrives at between 360 s and 600 s, it will include the video of position 600 with probability 1. If a peer arrives before 360 s or after 600 s, the peer cannot cover the video position.

Consideration of Peer Churn

The characterization of a peer's departure may be termed peer churn, and peer churn affects the aggregate of distributed stream caches. To reflect the peer churn in a model, one may assume that peers depart the system independently of each other according to exponential distribution of rate μ. If a peer arrives at time S and covers video of position x, the probability that this peer is still available at time t is given as:

$$Pr\{P \text{ is available at time } t\} = Pr\{D_P \ge t\}$$

$$= e^{-\mu(t-S)},$$

where $D_P$ is the departure time of the peer.

Accordingly, the revised model of the data availability is as follows:

$$Pr\{x \text{ is available at time } t\} =$$

$$\sum_{i=1}^{\infty} \left\{ 1 - \left\{ 1 - \int e^{-\mu(t-S)} Pr\{x|S\}\frac{1}{t}dS \right\}^i \right\} e^{-\lambda t}\frac{(\lambda t)^i}{i!}$$

FIGS. 22 and 23 show the video availability under IPP at time 7200. Since the early portion of the video has been cached by relatively many peers, it retains the probability of one even with peer churns. The availability of the later portion of video is also affected by peer churn, but such affect is negligible when compared with the LSP case. Under the LSP cache policy, peers are distributed evenly across the video. Therefore, a small fraction of peer churn may affect the availability of the corresponding video portion. It is well observed in FIG. 23. Note that the LSP still achieves good data availability for any video portion. On the contrary, the IPP data availability is lower for the later part of the video.

Average Number of Peers

Having addressed the probability for data availability, another metric of data availability is the average number of peers available for video of position x at time t.

$$E\{M(x, t)\} = \sum_{k=1}^{\infty} k Pr\{M(x, t) = k\} =$$

$$\sum_{k=1}^{\infty} k \sum_{i=k}^{\infty} Pr\{k \text{ of } i \text{ cover } x \mid N(t) = i\} Pr\{N(t) = i\} =$$

$$\sum_{k=1}^{\infty} k \sum_{i=k}^{\infty} \binom{i}{k} p^k (1-p)^{i-k} e^{-\lambda t} \frac{(\lambda t)^i}{i!}$$

Where $p = \int_0^t Pr\{x \text{ is covered} - \text{an arrival at } S\} \frac{1}{t} dS$.

Figures 25, 26:
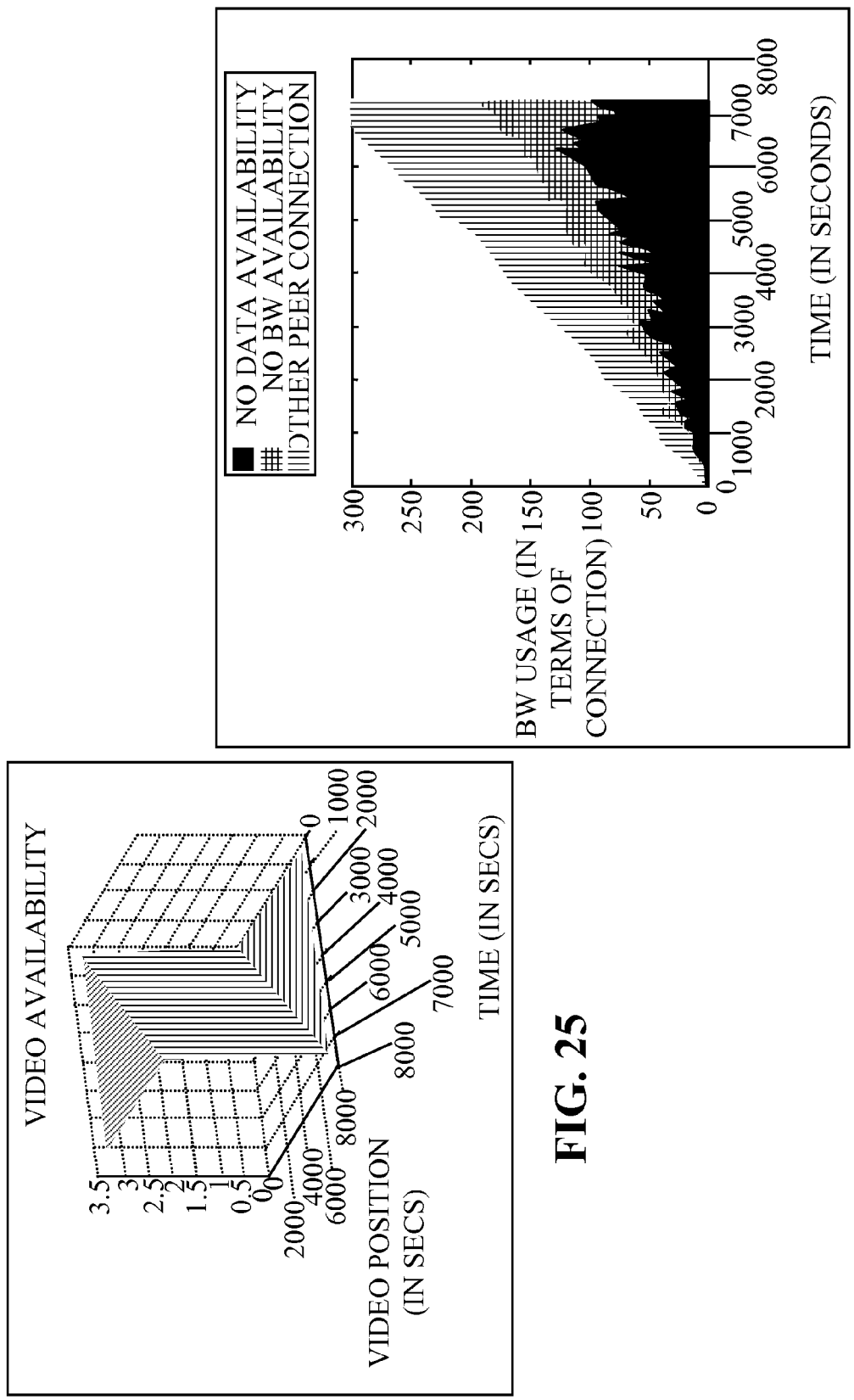
FIG. 25 is a three-dimensional graph of the average number of peers available at time t, for video of position x; Np=100; D=240 s; under the modeled LSP policy of the present invention.
FIG. 26 is a graph of the resulting connections modeled under the IPP policy.

M(x, t) in this exemplary model is a random variable given x and t, denoting the number of peers available with x at time t. To get Pr {M(x, t)=k}, one conditions the probability with the Poisson process N(t). Since any peer out of k can cover x independently from each other, one may apply the Binomial distribution formula to reach the last step. FIG. 24 illustrates the average number of peers available under the IPP policy. For a fixed position, x, the function increases over time at a decreasing rate. For a fixed time t, the maximum value occurs always at x=0, and the function decreases rapidly toward t. FIG. 25 depicts the average number of peers available under the LSP policy. It shows that on average, peers are uniformly spread over the entire video.

Experimental Results

A discrete-time event simulator was developed to evaluate the performance of the IPP and LSP cache algorithms that may be executed by one or more computing nodes in a system. Presented are the simulation results for the two distributed cache algorithms that are based on the following modeled conditions: (a) the video stream length is set to two (2) hours (i.e., 7200 seconds); (b) three hundred peers join the system according to a Poisson process during the video session of two hours; (c) the size of the DSC (distributed stream cache) for each peer is the same and in the exemplary simulation, each holding a four-minute-long portion of the video stream; (d) there is one video streaming server streaming the video as a live stream; (e) the video rate is presumed to be a constant bit-rate, R (in bits per second); (f) each peer has an uplink bandwidth of 3 R and each peer has a bandwidth that is twice as much as the uplink bandwidth; and (g) the quantization factor, Q, is set to ten seconds.

Performance of IPP

In this section, one may assume a peer that arrives at time t choose its initial play-out position between [0, t)] uniformly. Peers do not leave the system once they join. FIG. 26 shows the type of connections peers make to get their video streams over time. Both "No Data Availability" and "No BW Availability" connections are established to the server. The connections of "No Data Availability" are made because there are no peers that hold the requested video segments. The connections of "No BW Availability" are made because peers that hold the requested video segments do not have available uplink bandwidth to support other peers.

Figure 27:
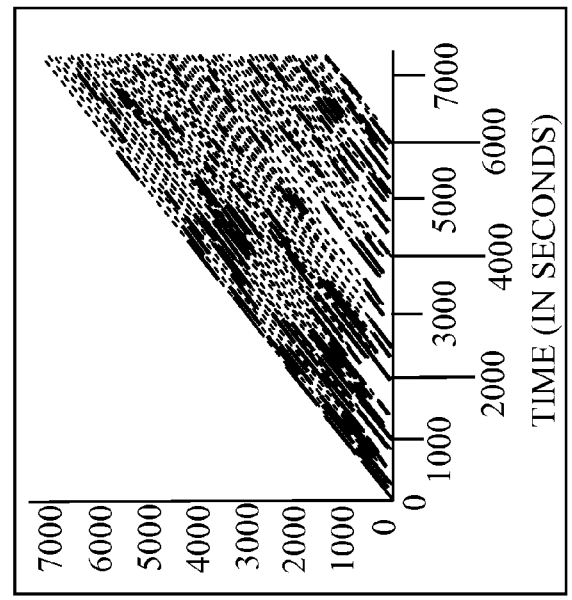
FIG. 27 is a graph of the availability of video segments at time 7200 secs under the IPP policy.

In FIG. 27, the availability of video segments is shown when the video session is over at time 7200*s*. It is observed that many peers cache the early portion of the video.

Figure 28:
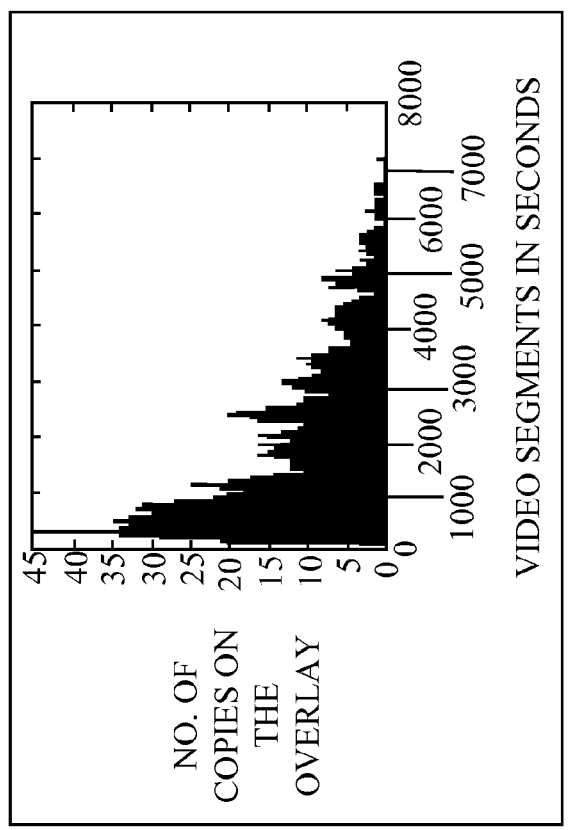
FIG. 28 is an exemplary time-video plot under the IPP policy.

FIG. 28 illustrates the trajectory of peers' play-out position and their DSC. The sloped line segments represent and indicate the DSC's starting and ending time of filling and contents in terms of the video position in seconds. Accordingly, the starting video position and time of peers occur at the lower left of each line. This figure matches FIG. 27 when one sums the number of lines that one crosses when one draws a horizontal line per video segment. Clearly, there are more peers that cache the early portion than the late portion of the video.

Performance of LSP

Figures 29, 30:
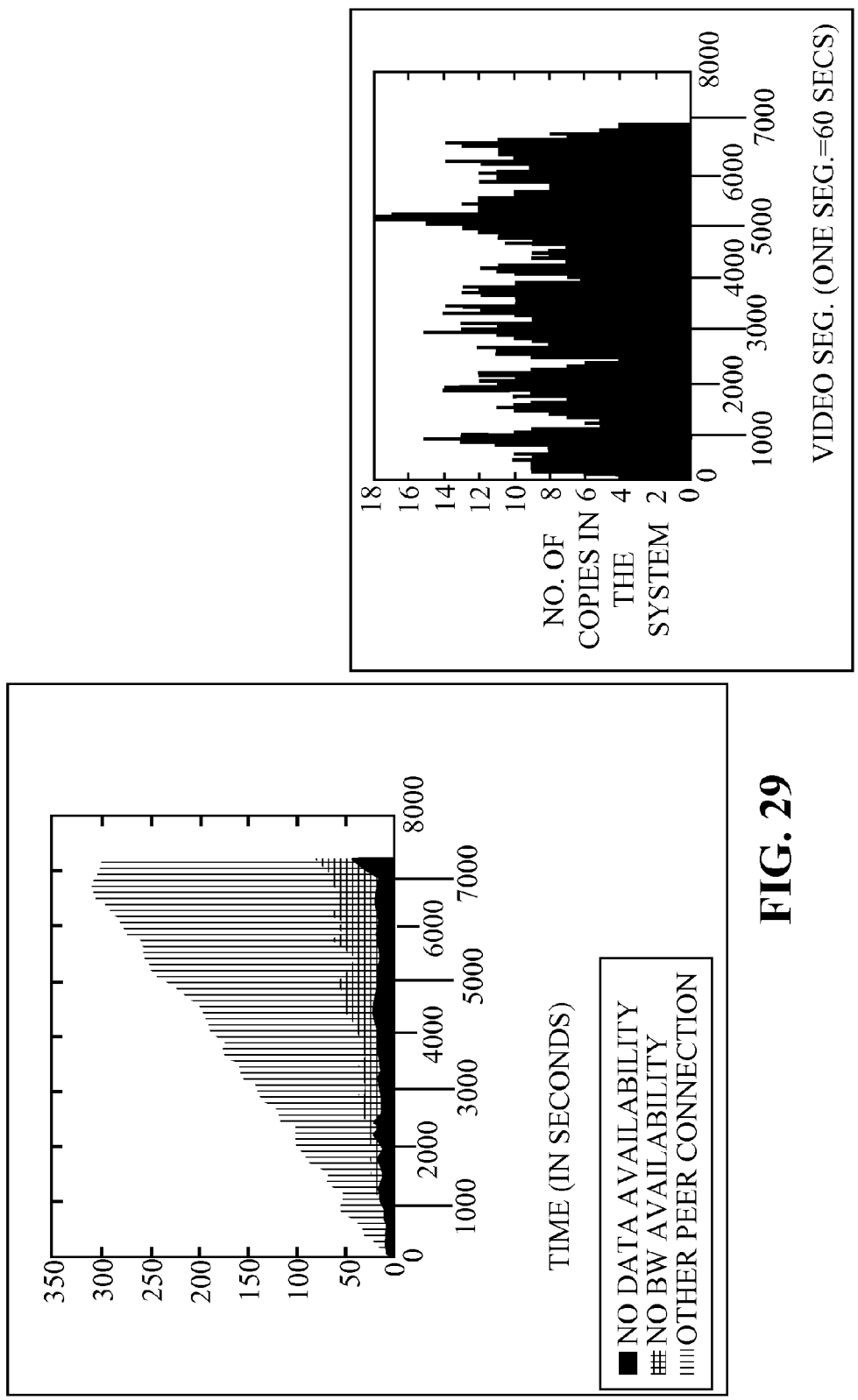
FIG. 29 is a graph of the resulting connections modeled under the LSP policy.
FIG. 30 is a graph of the availability of video segments at time 7200 secs under the LSP policy.
Figure 31:
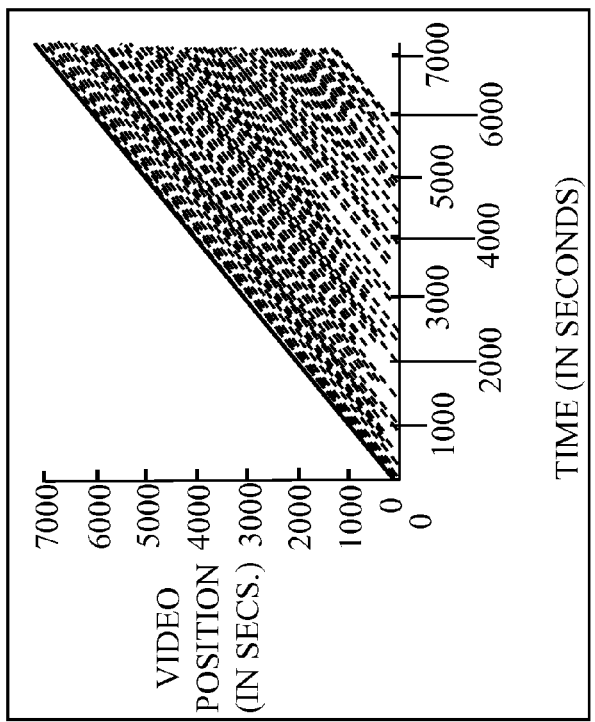
FIG. 31 is an exemplary time-video plot under the LSP policy.

This section discloses simulation results of the LSP algorithm as executed in a model of the exemplary system. FIG. 29 shows the type of connections over time. It can be seen that the number of "No Data Availability" connections does not grow over time. FIG. 30 shows the availability of video segments at time 7200 s. In FIG. 31, the time-video plot is shown. It is notable that DSC trajectories overlap the live stream trajectory. Under the LSP algorithm, peers cache the live stream regardless of their initial play-out position by establishing an extra connection.

Effect of Multicast Connection

In this section, the effect of modeled multicast connections is assessed and explained when peers tend to watch the live stream portion at the time of join. When peers arrive at the system, they select the live stream position for play-out with probability of 0.3. Otherwise, they uniformly choose any portion of the video available, same as in the previous sections.

Figure 32:
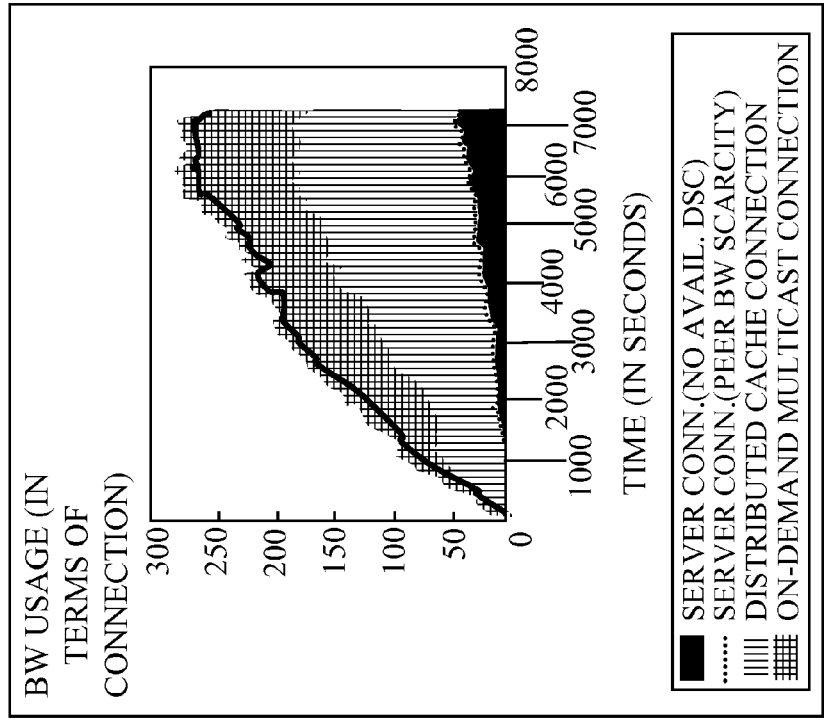
FIG. 32 is an exemplary time-video plot of a system operating under the LSP policy with multicast connections.

FIG. 32 shows the type of connections over time under the LSP algorithm. It is clear that the multicast connections account for much area on the figure. Note that cache filling of the live stream also benefits from getting data through the multicast connection. This implies that our P2TSS system nicely extends typical live-video streaming with time-shifted streams.

Effect of Peer Churn

Figure 33:
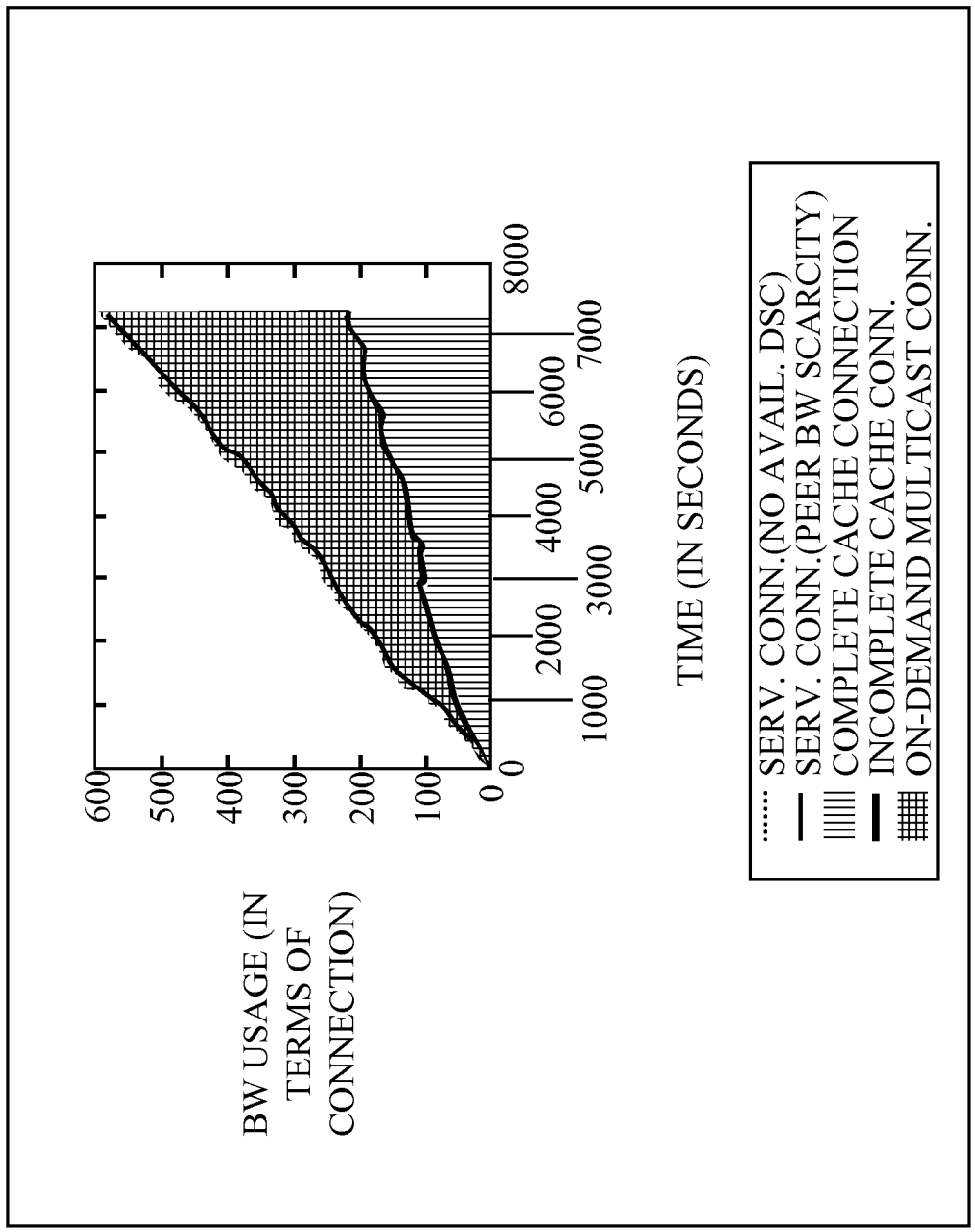
FIG. 33 is a graph of the resulting connections modeled under the LSP policy with no peer chum.

Presumption thus far for models and results presumed no peer leaves the system. In this section, the effect of peer churn on the system performance is addressed. Peers leave the system independently of each other. Their uptime (time to stay in the system) follow an exponential distribution and the average uptime is set to L2, where L is the video length in seconds. Six hundred peers join the system compared to the previous settings. In addition, peers' uplink bandwidth is increased to 6 R. FIG. 33 highlights the effects of peer churn. In FIG. 33, the type of connection over time is shown. In this figure, connections to complete and incomplete DSCs are distinguished. Complete DSCs are the caches that are filled with continuous video segments. Peers with incomplete DSCs are filling the video into the cache. Peer churn also affects the multicast connection. Since peers need to have overlapped play-out buffers to form a multicast group, the departures of some peers may break the multicast tree apart, thus hampering the growth of the multicast tree.

One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method comprising:
filling a first client playback buffer with a portion of a video packet (VP) stream having a first VP stream time delimitation received from a VP source via a packet transmission network;
receiving by the first client, from a server, a caching policy via the packet transmission network, wherein the caching policy comprises at least one of: an Initial Play-out Position IPP) policy and a Live Stream Position (LSP) policy;
filling a first client distributed stream cache with the portion of the VP stream having the first stream time delimitation according to the at least one of the IPP policy and the LSP policy wherein:
(a) if the IPP policy is received by the client, filling the first client distributed stream cache with blocks of the VP stream, wherein the first client distributed stream cache comprises the portion of the VP stream resident in at least one of:
a first time interval whose endpoints envelope a playback position point of the first client, and
a second time interval whose first closed endpoint is the playback position point of the first client, as based on a quantization factor received by the first client;
(b) if the LSP policy is received by the first client then filling the first client distributed stream cache directly with a currently broadcasted portion of the VP stream source;
(c) if both policies are received by the client, then bifurcating the first client distributed stream cache and filling each bifurcated cache according to the IPP and LSP policies;
notifying the server of the portion of the VP stream having the first VP stream time delimitation stored in the first client distributed stream cache being available for access via the packet transmission network;
requesting to the server, by a second client having a second playback buffer, a second portion of the VP stream having a second VP stream time delimitation; and
if the second VP stream time delimitation comprises the first VP stream time delimitation, then filling the second playback buffer with the portion of the VP stream having the first VP stream time delimitation received from the first client via the packet transmission network.

2. The method of claim 1 wherein the filling step of the first client stream cache comprises a step of copying the video stream portion having the first stream time delimitation stored in the first client playback buffer to the first client distributed stream cache .

3. The method of claim 1 wherein the filling step of the first client distributed stream cache comprises the steps of:
filling the first client distributed stream cache with a portion of the VP stream preceding the time delimitation of the first VP stream time delimitation from the VP source and then copying the video stream portion having the first stream time delimitation stored in the first client playback buffer to the first client distributed stream cache.

4. The method of claim 1 wherein the step of filling the first client distributed stream cache using the IPP policy is performed by opening a second connection in parallel with the connection opened for filling the first client playback buffer.

5. The method of claim 1 wherein the step of filling the first client distributed stream cache using the LSP policy is performed by opening a second connection in parallel with the connection opened for filling the first client playback buffer.

6. A system comprising:
(a) a plurality of processing nodes, each processing node connected to a packet transmission network via a network link, each processing node comprising:
(i) a first addressable memory comprising a playback buffer and a distributed stream cache: and
(ii) a first processing subsystem in communication with the first addressable memory and configured to:
receive a caching policy via the packet transmission network, wherein the caching policy comprises at least one of: an Initial Play-out Position (IPP) policy and a Live Stream Position (LSP) policy;
notify a controller node of a portion of a video packet (VP) stream having a first VP stream time delimitation stored in a first client distributed stream cache being available for access via the packet transmission network;
requesting to the controller node, by a second client having a second playback buffer, a second portion of the VP stream having a second VP stream time delimitation; and
if the second VP stream time delimitation comprises the first VP stream time delimitation, then fill the second playback buffer with the portion of the VP stream having the first VP stream time delimitation received from the first client via the packet transmission network; and
(b) the controller node comprising::
(i) a second addressable memory: and
(ii) a second processing subsystem in communication with the second addressable memory and configured to:
fill a first client playback buffer with the portion of the VP stream having the first VP stream time delimitation received from the VP source via the packet transmission network;
fill the first client distributed stream cache with the portion of the VP stream having the first stream time delimitation according to the at least one of the IPP policy and the LSP policy, wherein:
(a) if the IPP policy is received by the first client, filling the first client distributed stream cache with blocks of the VP stream, wherein the first client distributed stream cache comprises the portion of the VP stream resident in at least one of: a first time interval whose endpoints envelope a playback position point of the first client, and a second time interval whose first closed endpoint is the playback position point of the first client, as based on a quantization factor received by the first client;
(b) if the LSP policy is received by the client, then filling the first client distributed stream cache directly with a currently broadcasted portion of the VP stream source;
(c) if both policies are received by the client, then bifurcating the first client distributed stream cache and filling each bifurcated cache according to the IPP and LSP policies.

* * * * *

UNITED STATES PATENT AND TRADEMARK OFFICE
CERTIFICATE OF CORRECTION

PATENT NO. : 7,975,282 B2  Page 1 of 1
APPLICATION NO. : 11/933730
DATED : July 5, 2011
INVENTOR(S) : Deshpande et al.

It is certified that error appears in the above-identified patent and that said Letters Patent is hereby corrected as shown below:

Column 16, line 28
 replace "chum" with "churn"

Column 16, line 29
 replace "chum" with "churn"

Column 18, line 33
 replace "chum" with "churn"

Signed and Sealed this
Thirteenth Day of September, 2011

David J. Kappos
*Director of the United States Patent and Trademark Office*